(12) United States Patent
Belt et al.

US011823251B2

(10) Patent No.: US 11,823,251 B2
(45) Date of Patent: Nov. 21, 2023

(54) METHODS AND SYSTEMS FOR PROVIDING WIRELESS GUIDANCE IN A RETAIL SPACE

(71) Applicant: Blind InSites, LLC, Plano, TX (US)

(72) Inventors: Darwin Wayne Belt, Plano, TX (US); April Ryan Hilton, Carrollton, TX (US); Jeffrey D Hilton, Carrollton, TX (US); Jessica B Hipp, Temple, NH (US); Zachary Nolan Belt, Plano, TX (US)

(73) Assignee: Blind InSites, LLC, Plano, TX (US)

( * ) Notice: Subject to any disclaimer, the term of this patent is extended or adjusted under 35 U.S.C. 154(b) by 0 days.

(21) Appl. No.: 16/861,940

(22) Filed: Apr. 29, 2020

(65) Prior Publication Data

US 2020/0342519 A1    Oct. 29, 2020

Related U.S. Application Data

(60) Provisional application No. 62/839,939, filed on Apr. 29, 2019.

(51) Int. Cl.
*G06Q 30/00* (2023.01)
*G06Q 30/0601* (2023.01)
*G06K 19/07* (2006.01)

(52) U.S. Cl.
CPC ..... *G06Q 30/0639* (2013.01); *G06K 19/0723* (2013.01)

(58) Field of Classification Search
CPC ................. G06Q 30/0639; G06K 19/0723
USPC ............................................... 705/26.9
See application file for complete search history.

(56) References Cited

U.S. PATENT DOCUMENTS

| | | | |
|---|---|---|---|
| 6,429,776 B1 | 6/2002 | Alicot et al. | |
| 6,595,417 B2 | 7/2003 | O'Hagan et al. | |
| 7,617,132 B2 | 11/2009 | Reade et al. | |
| 7,679,522 B2 | 3/2010 | Carpenter | |
| 7,756,757 B1 | 7/2010 | Oakes, III | |
| 8,180,364 B2 | 5/2012 | Fano et al. | |
| 8,682,929 B2 | 3/2014 | Starr | |
| 9,443,276 B2 | 9/2016 | Barry, III | |
| 9,451,389 B2 | 9/2016 | Beg et al. | |
| 10,176,514 B1 * | 1/2019 | Chen | G06Q 30/0633 |

(Continued)

OTHER PUBLICATIONS

Allrecipes uses beacon technology to offer an enhanced shopping experience and answer the perpetual question: What's for dinner tonight?: Allrecipes partners with marc's, verifone and footmarks to deploy in-store beacon networks and notifications. (Jun. 2, 2016). PR Newswire (Year: 2016).*

(Continued)

*Primary Examiner* — Arielle E Weiner
(74) *Attorney, Agent, or Firm* — CALDWELL INTELLECTUAL PROPERTY LAW

(57) ABSTRACT

A system for providing wireless guidance in a retail space includes a portable computing device configured to wirelessly receive a signal from a first transmitter located at a product in a retail space, parse the first signal for a plurality of textual elements, the plurality of textual elements including a first identifier that is a transmitter identifier and at least a second identifier, retrieve at least a product information datum using the plurality of textual elements, generate a display element using the product information datum, and display the display element to the user.

19 Claims, 5 Drawing Sheets

(56) References Cited

U.S. PATENT DOCUMENTS

| | | | |
|---|---|---|---|
| 10,430,841 B1* | 10/2019 | Shah | G06Q 30/0281 |
| 2005/0021561 A1* | 1/2005 | Noonan | G06Q 20/203 |
| 2006/0190332 A1* | 8/2006 | Grider | G06Q 30/02 |
| | | | 705/14.27 |
| 2007/0290038 A1 | 12/2007 | Woodcock et al. | |
| 2012/0310720 A1 | 12/2012 | Balsan et al. | |
| 2013/0191250 A1 | 7/2013 | Bradley et al. | |
| 2015/0079942 A1* | 3/2015 | Kostka | G06Q 30/0267 |
| | | | 455/411 |
| 2015/0088642 A1* | 3/2015 | Mathew | G06Q 30/0631 |
| | | | 705/14.51 |
| 2015/0278888 A1* | 10/2015 | Lu | G06Q 30/0267 |
| | | | 705/26.1 |
| 2015/0339694 A1* | 11/2015 | Robbin | H04W 4/80 |
| | | | 705/14.1 |
| 2017/0148077 A1* | 5/2017 | Phillips | A47F 5/0018 |
| 2018/0082349 A1* | 3/2018 | Viera | H04W 4/024 |
| 2018/0107978 A1* | 4/2018 | Drey | G06Q 20/204 |
| 2018/0173896 A1 | 6/2018 | Arneson et al. | |
| 2018/0260885 A1* | 9/2018 | Binafard | G06Q 20/12 |

OTHER PUBLICATIONS

Ref U Continued: Retrieved from https://www.proquest.com/wire-feeds/allrecipes-uses-beacon-technology-offer-enhanced/docview/1793451808/se-2 (Year: 2016).*
https://domino.fov.uni-mb.si/proceedings.nsf/0/a66cb9d0ff2a357ec1257014004bde9a/$FILE/47Loebbecke.pdf.
PCT/US2021/029140; International Search Report; dated May 18, 2021 ; Authorized Officer, By: Harry Kim.

* cited by examiner

METHODS AND SYSTEMS FOR PROVIDING WIRELESS GUIDANCE IN A RETAIL SPACE

CROSS-REFERENCE TO RELATED APPLICATIONS

This application claims the benefit of priority of U.S. Provisional Patent Application Ser. No. 62/839,939 filed on Apr. 29, 2019 and entitled "METHODS AND SYSTEMS FOR PROVIDING WIRELESS GUIDANCE IN A RETAIL SPACE," which is incorporated by reference herein in its entirety.

FIELD OF THE INVENTION

The present invention generally relates to the field of localized wireless communication. In particular, the present invention is directed to methods and systems for providing wireless guidance in a retail space.

BACKGROUND

Technology used to provide product and other information in retail environments remains limited in nature. Well-worn systems of universal product codes (UPC), newspaper or email coupons, and product displays have been combined to a limited extent with Internet-based stores and informational websites, but information is not updated effectively, and source control issues make for error-prone results.

SUMMARY OF THE DISCLOSURE

In an aspect, a method of providing wireless guidance in a retail space includes wirelessly receiving, by a portable computing device operated by a user, a signal from a first transmitter located at a product in a retail space, parsing, by the portable computing device, the first signal for a plurality of textual elements, the plurality of textual elements including a first identifier, wherein the first identifier is a transmitter identifier, and at least a second identifier, retrieving, by the portable computing device, at least a product information datum using the plurality of textual elements, generating, by the portable computing device, a display element using the product information datum, and displaying, by the portable computing device, the display element to the user.

In another aspect, a system for providing wireless guidance in a retail space includes a portable computing device configure to wirelessly receive a signal from a first transmitter located at a product in a retail space, parse the first signal for a plurality of textual elements, the plurality of textual elements including a first identifier, wherein the first identifier is a transmitter identifier and at least a second identifier, retrieve at least a product information datum using the plurality of textual elements, generate a display element using the product information datum, and display the display element to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of the disclosed systems and methods use local wireless communication to acquire and/or exchange comprehensive and up-to-date product information in retail spaces. Information may be provided to users, including without limitation customers, and/or updated by system elements and/or users, including without limitation personnel operating retail spaces. Product information may include locations of products and related items, directions to shelf locations of products and related items, and other related content such as pricing and loyalty program information. Users acting as customers may be able to locate replacement parts and/or accessories, component and/or ingredient information, certifications, and other useful information, and may be able to order and/or pay for products using the disclosed system. Updates to planograms may be coordinated with local wireless first transmitters either to reflect current product layout or to direct movement of products to conform to an updated planogram.

Figure 1:
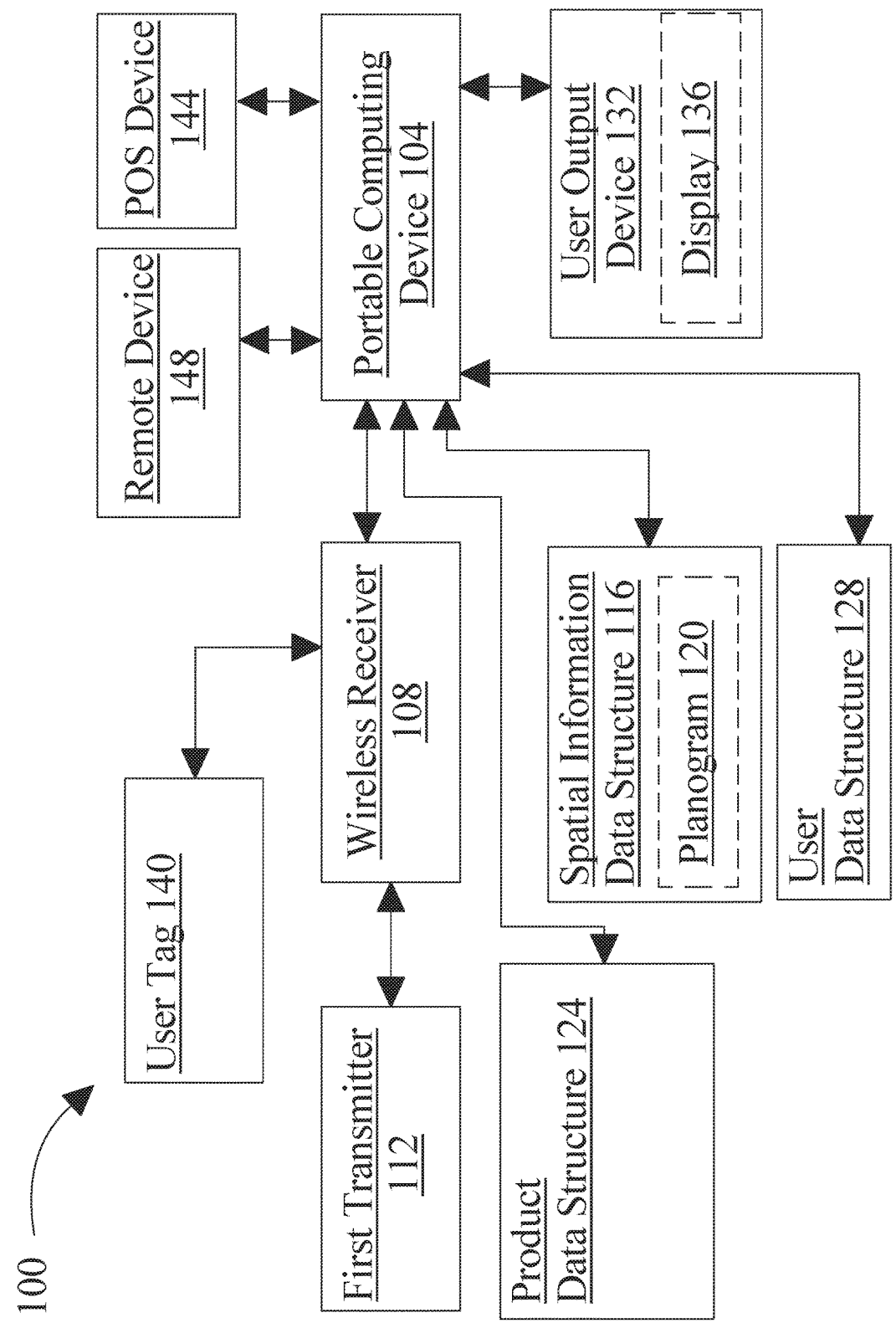
FIG. 1 is a block diagram illustrating an exemplary embodiment of a system for providing wireless guidance in a retail space.

Referring now to FIG. 1, an exemplary embodiment of a system 100 for wireless acquisition and presentation of local spatial information is illustrated. System 100 includes a portable computing device 104. Portable computing device 104 may be any computing device as described and defined in this disclosure. Portable computing device 104 may be any computing device that may be carried on the person of a user. Portable computing device 104 may include any computing device as described in this disclosure, including without limitation a microcontroller, microprocessor, digital signal processor (DSP) and/or system on a chip (SoC) as described in this disclosure. Portable computing device 104 may include any computing device as described in this disclosure, including without limitation a microcontroller, microprocessor, digital signal processor (DSP) and/or system on a chip (SoC) as described in this disclosure. Portable computing device 104 may include, be included in, and/or communicate with a mobile device such as a mobile telephone or smartphone. Portable computing device 104 may include a single computing device operating independently, or may include two or more computing device operating in concert, in parallel, sequentially or the like; two or more computing devices may be included together in a single computing device or in two or more computing devices.

Portable computing device 104 may interface or communicate with one or more additional devices as described below in further detail via a network interface device. Network interface device may be utilized for connecting [computing device] to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Portable computing device 104 may be designed and/or configured to perform any method, method step, or sequence of method steps in any embodiment described in this disclosure, in any order and with any degree of repetition. For instance, portable computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Portable computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, portable computing device 104 may be in communication with a wireless receiver 108, where "in communication" signifies ability to send signals to, and receive signals from, wireless receiver 108, either directly or via an intermediate device. For instance, and without limitation, wireless receiver 108 may be incorporated in an additional portable computing device 104 such as a user mobile phone, smartphone, tablet, personal digital assistant, and/or any other computing device, portable computing device 104, receiver, or device as described anywhere in this disclosure, which may connect to portable computing device 104 via a network, which may be a local area network, a wide area network, the Internet, or any other network passing electronic wired and/or wireless communication between devices. Portable computing device 104 may be electronically connected to wireless receiver 108, and/or in wireless communication with wireless receiver 108; portable computing device 104 may perform wireless communication with wireless receiver 108 using any suitable protocol, including without limitation BLUETOOTH protocols as described above.

Continuing to refer to FIG. 1, wireless receiver 108 may have an antenna. Wireless receiver 108 may include a wireless interrogator; in other words, the antenna may be capable of inducing a current in an antenna of a passive transmitter through magnetic coupling, capacitive coupling, or other means. Wireless receiver 108 may be able to receive the signal transmitted by one or more first transmitters as described below using the antenna. In some embodiments, the wireless receiver 108 can transmit as well as receive signals. Wireless receiver 108 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Wash. Transceiver may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna may include a plurality of antennas; for example, and without limitation, antenna may include a first antenna that transmits interrogation signal, and a second antenna that receives return signal. Antenna may include multiple antennas that receive and/or transmit signals; for instance, antenna may include antennas facing in various directions for transmitting interrogation signals and receiving return signals to and from various directions simultaneously. Similarly, wireless receiver 108 may include both an antenna for receiving from and/or transmitting signals to a first transmitter and a transceiver that may be used for communicating with a mobile computing device, for instance as described below. Wireless receiver 108 may include any device capable of or configured to receive any signal in the form of electromagnetic radiation, including without limitation visible spectrum light, infrared light, radio waves, or signals in any other portion of the electromagnetic spectrum, capacitive or magnetic inductance, or any other form of wireless communication that may be established between two electronic devices or components.

Still referring to FIG. 1, wireless receiver 108 may include a driver circuit. Driver circuit is an electric circuit, electrically coupled to antenna, that processes electric signals induced in antenna by wireless signals and processes the electric signals. In other words, driver circuit may be any electrical circuit configured to wirelessly receive a signal from a first transmitter, as described in further detail below, via antenna. Where wireless receiver 108 includes a wireless interrogator, driver circuit may further be configured to wirelessly transmit an interrogation signal via the antenna to a passive transponder; the interrogation signal may provide electrical power to the passive transponder. Driver circuit may further be configured to wirelessly receive a return signal from the transponder via the antenna.

With continued reference to FIG. 1, driver circuit may include analog components, digital components, or both. For instance, driver circuit may include one or more filters (not shown), such as a Butterworth filter, a Chebyshev filter, a band filter, or the like, to filter out noise or selectively receive particular frequencies or ranges of frequencies. Driver circuit may include one or more amplifiers. Driver circuit may include a logic circuit, or a circuit including at least one digital circuit element. Logic circuit may be hardwired; for instance, logic circuit may include logic hardware circuit components such as logic gates, multiplexors, demultiplexors, programmable circuits such as field-programmable arrays, read-only memory, and the like. Logic circuit may include memory, which may be any memory as described below in reference to FIG. 4. Logic circuit may include a computing device as described below in reference to FIG. 4. In some embodiments, the wireless receiver 108 includes a computing device; the computing device may be any computing device as described below in reference to FIG. 4. As a non-limiting example, the wireless receiver 108 may be a mobile computing device such as a mobile phone, "smartphone," or tablet; wireless receiver 108 may be incorporated in a mobile computing device. Wireless receiver 108 may be incorporated in a special-purpose device, such as handheld device or device mounted on a finding aid that, as a non-limiting example, is wirelessly or otherwise coupled to a mobile or portable computing device 104. Computing device may be a microcontroller.

Still referring to FIG. 1, wireless receiver 108 may include a power source. Power source may include a power storage device; the power storage device may include a battery. Power storage device may include a capacitor; for instance, the power storage device may include an ultracapacitor. Power storage device may include a magnetic power storage device, such as a device that incorporates an inductor. In some embodiments, power source includes a photovoltaic device; the photovoltaic device may be any device that converts light to electric power. Power source may include power provided by an electrical network, for example including electric power accessed via a wall-plug; the electrical power may be alternating current "mains" power, or power generated by solar panels, wind turbines. Wireless receiver 108 may charge wirelessly; for instance, the wireless receiver 108 may charge inductively. Wireless receiver 108 may include an inertial power source that generates mechanical or electrical power from movement of wireless receiver 108, including without limitation an inertial power source that generates power from walking or swinging a cane on which inertial power source is mounted. Wireless receiver 108 may include an optical capture device, such as a camera, optical scanner, laser scanner, or the like.

With continued reference to FIG. 1, wireless receiver 108 is configured to receive a signal from at least a first transmitter 112. In some embodiments, where at least a first transmitter 112 includes a passive transmitter as described in further detail below, wireless receiver 108 may receive the signal by producing an interrogation signal using an interrogator, and receiving the signal generated by the passive transmitter in return. In other embodiments, where at least a first transmitter 112 includes an active transmitter as set forth in further detail below, wireless receiver 108 listens for the transmission frequency of at least a first transmitter 112 and inputs the signal upon receiving the signal output by at least a first transmitter 112. Wireless receiver 108 may exchange signals with at least a first transmitter 112; for instance, wireless receiver 108 may transmit a query to at least a first transmitter 112 and receive data in response to the query. Wireless receiver 108 may similarly receive a signal from a second transmitter or from additional transmitters situated in a retail space 200, as described in further detail below. Wireless receiver 108 may be configured to receive content data from at least a first transmitter 112 or a second transmitter. Wireless receiver 108 may be configured to receive product data from at least a first transmitter 112 or a second transmitter.

Alternatively, or additionally, and still referring to FIG. 1, wireless receiver 108 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where wireless receiver 108 is a mobile device such as a mobile phone or tablet, or is coupled to such a device, the code reader may be the camera of the mobile device. The mobile device may be configured to input a QR or UPC code using the camera and then extract the data contained in the code using software. In any embodiment of methods, systems, and/or devices described herein in which wireless receiver 108 receives a return signal including a unique identifier and processes that return signal, wireless receiver 108 may similarly obtain the unique identifier by way of a code reader and process the unique identifier in a like manner. In an embodiment, first transmitter 112 may include a QR code and/or UPC code, or other optical code; receiving signal may include scanning an optical code.

With continued reference to FIG. 1, system 100 may include and/or communicate with at least a first transmitter 112. At least a first transmitter 112 may include any device that outputs a signal using electromagnetic radiation; the signal may be sent using any frequency usable in communication, including without limitation radio waves, microwaves, infrared waves, and visible light. At least a first transmitter 112 may include an antenna. At least a first transmitter 112 may include a passive transmitter, such as those used for passive radio frequency identification ("RFID") or near field communication ("NFC") tags. In some embodiments, passive transmitter includes an antenna in which electric current is induced by magnetic coupling from an antenna, such as antenna of wireless receiver 108; the induced electric current may power the passive transmitter, which may use additional circuitry such as a logic circuit to analyze the signal and generate a response signal. Logic circuit may be any logic circuit as described above regarding driver circuit. At least a first transmitter 112 may output signal by modifying electromagnetic radiation using means other than an antenna. For instance, at least a first transmitter 112 may absorb and/or reflect ambient or directed electromagnetic radiation in visible or other spectra; first transmitter 112 may emit and/or reflect such electromagnetic radiation in spectrally altered pattern that may be detected using a code reader, antenna, or other device or component of wireless receiver 108. This may be accomplished, in a non-limiting example, using one or more pigments disposed on a surface of first transmitter 112; one or more pigments may include, as a non-limiting example, two or more contrasting pigments, which may be provided in a one-dimensional or two-dimensional distribution. Non-limiting examples of such pigmented arrangements may include quick-read codes and/or universal product codes, as rendered on physical objects, electronic displays, and the like.

Still referring to FIG. 1, response signal may be output by the same antenna. The response signal may be output by an additional antenna; in other words, as described above for wireless first transmitter, antenna may include multiple antennas. In some embodiments, the passive transmitter has a plurality of antennas to enable the first transmitter to capture the signal optimally from a plurality of angles. The signal from the interrogator may contain no information, functioning solely to activate the passive transmitter. In other embodiments, the signal from the interrogator contains information that circuitry in the passive transmitter processes.

Continuing to refer to FIG. 1, at least a first transmitter may include an active transmitter. Active transmitter may be a transmitter having a power source other than an interrogation signal; power source may be any power source as described above. Active transmitter may use the antenna to broadcast a signal periodically. Active transmitter may use the antenna to listen for incoming signals and transmit in response to a detected signal. Active transmitter may perform both actions; for instance, active transmitter may periodically transmit a first signal, and also transmit one or more second signals in response to signals at least a first transmitter receives. At least a first transmitter may include a transceiver, which may be any transceiver as described above. At least a first transmitter may include a beacon using any beacon protocol as described above.

Still referring to FIG. 1, at least a first transmitter may include a memory. Memory may be any memory as described below in reference to FIG. 4. In some embodiments, memory is read-only. In other embodiments, memory may be writable. The writable memory may require authentication; for instance, the writable memory may be writable only given a password, identifier, key, or other data indicating that the device that will be modifying the memory is authorized. Memory may include any combination of the above; for instance, memory may include a read-only section. Memory may include a writable section with limited access. Memory may include a writable section with general access, to which any user may be able to write data. Memory may include the read-only section and the generally writable section, or the limited access writable section and the generally writable section, or the read-only section and the limited access section. The limited access section may be limited to users of the system 100, or in other words may be generally writable, but only to users of the system 100, who may have the requisite access codes as a result of joining the system 100 as users; the users may alternatively be granted the access codes by the system 100 to update information on at least a first transmitter only when authorized by the system, and otherwise be unable to update the memory; in this way, the system 100 may be able to update information on at least a first transmitter memory efficiently by way of the receiver while maintaining security against misuse of the memory. In some embodiments, preventing users from being able to write over memory enables the memory to be free from intentional or unintentional corruption or inaccuracy, and enables the system 100 to ensure that certain information is always available to users of at least a first transmitter. In some embodiments, writable sections enable the system 100 itself or users of the system 100 to correct, augment, or update information as described in further detail below.

Continuing to refer to FIG. 1, at least a first transmitter 112 is configured to transmit a signal. Signal may be a return signal in response to a prompt by another wireless communication device, including without limitation wireless receiver 108. Signal may be a return signal in response to interrogation by an interrogator included in another wireless communication device, including without limitation wireless receiver 108. Signal may be any wirelessly transmitted signal, including without limitation any signal transmitted through electromagnetic radiation, magnetic coupling, capacitive or other electronic coupling, or any other wireless means. Signal may include an identifier; identifier may identify at least a first transmitter 112, and/or a product. At least a first transmitter 112 may identify a specific location within a retail space as described in further detail below; specific location may include, without limitation, a location to which at least a first transmitter 112 is attached or affixed. Specific location may be static. For example, a first transmitter of at least a first transmitter 112 may identify a specific location on a specific shelf in a store; products may be switched out at that location and a reference to a database, which may include any data structure as described in this disclosure, may identify which product is then stored at that location, for instance pursuant to or in reflection of a planogram update as described in further detail below. Identification of which product is stored at which location may be updated first, followed by movement of the product to the new location. In an embodiment, each first transmitter of at least a first transmitter 112 may have, store, and/or transmit a unique identifier. Identifier may take the form of a unique identifier that uniquely corresponds to at least a first transmitter 112 for the purposes of the system 100; this may be accomplished using methods including but not limited to Globally Unique Identifiers (GUIDs), Universally Unique Identifiers (UUIDs), which may be identifiers including numbers generated according to a standard which makes the chances of another UUID or GUID being identical to the instant identifiers negligible to the point of near-certain impossibility, or by maintaining a data structure, table, or database listing all first transmitter identifiers and checking the data structure, table listing, or database to ensure that a new identifier is not a duplicate. Identifier may alternatively identify a group of first transmitters including or included in at least a first transmitter 112. Group of first transmitters may be commonly owned; for instance, group of first transmitters may all be owned by a single person or entity. Owner of a first transmitter and/or group of first transmitters may have exclusive ability to modify information publicly associated with first transmitters, where information publicly associated with first transmitters includes information linked to identifier in any data structure as set forth in further detail below, or stored and transmitted by the first transmitter, and available to all users of portable computing devices like portable computing device 104. Alternatively or additionally, rights to change publicly available information may be possessed by individuals and/or groups having particular authentication credentials or the like. Information on data structures as described herein may be organized according to owner identifiers and/or identifiers of groups of first transmitters; in an embodiment, this manner of organization may make retrieval of data from data structures more efficient. For instance, and without limitation, owner identifier may be linked in a data structure or table to a location or identifier of a data structure and/or database relating to that owner identifier. As a further example, a single server or remote device, as described in further detail below, may include all information and/or data structure portions or instances pertaining to a particular owner identifier. As a non-limiting example one or more first transmitters of at least a first transmitter 112 may be formatted owner identifiers in the textual element prior to provision of the one or more first transmitters to the owner; alternatively or additionally a mechanism may be provided in an application or the like allowing an owner to format his or her own tags with the textual element identifying him or her as the owner. Signal may include other data in addition to identifier.

With continued reference to FIG. 1, data to be transmitted by at least a first transmitter 112 may be stored on at least a first transmitter 112 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on at least a first transmitter 112 and/or portable computing device 104.

Still referring to FIG. 1, portable computing device 104 may be designed and configured to parse a signal received from at least a first transmitter 112 for plurality of textual elements. Portable computing device 104 may be designed and configured to receive first signal from at least a first transmitter 112; receiving a signal from a first transmitter, as described herein, may include receiving signal via receiver, as communicatively connected to portable computing device 104 as described above. For instance, a receiver connected directly, wirelessly, or via an network to portable computing device 104 may receive a signal from a first transmitter via passively or actively scanning first transmitter, and then relay that signal to the portable computing device 104; e.g., a first user may scan or otherwise receive a signal from a first transmitter using a first portable computing device 104, such as a smartphone, which may then transmit the signal, or a message based on the signal, to portable computing device 104. Plurality of textual elements may include any datum or data that may be rendered as text, including without limitation numerical text, as any character or string of characters in any written language, as any punctuation, diacritical symbols, or other markings associated with any form of written text, and the like. Textual data may include a unique identifier, a product identifier, an identifier associated with a particular location in a retail space, or the like; persons skilled in the art, upon reviewing the entirety of this disclosure, will be aware of various elements of data that may be contained in textual data consistently with this disclosure.

Figure 2:
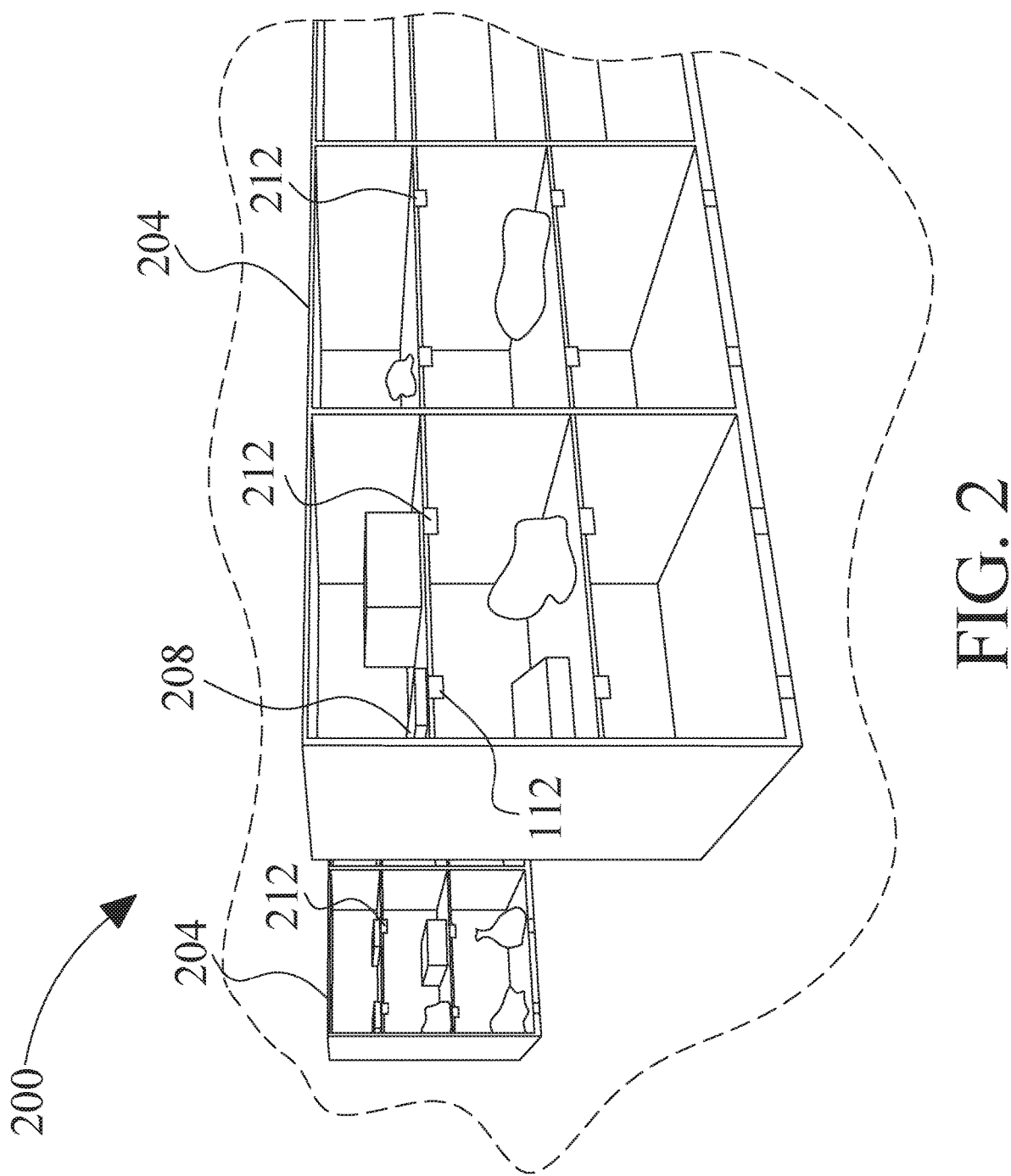
FIG. 2 is a schematic diagram illustrating an exemplary embodiment of a retail space.

Referring now to FIG. 2, an exemplary embodiment of a retail space 200 is illustrated. A retail space, as used herein, is any indoor or outdoor area where products are stored and retrieved for the purposes of sale. A retail space may include, without limitation, a store, a department within a store, such as the entirety of or a department within a supermarket, grocery store, sporting goods store, clothing store, hardware store, shoe store, a pharmacy, a home improvement store, a "big box" store, a department store, or the like. A retail space may include a temporary or outdoor market such as a "fair." A retail space may include a micro market, which may include any self-service purchasing system deployed in a room, corridor, lobby, or other space navigable by persons. A micro-market may include one or more vending machines, as well as products displayed on shelves, pegboards, display cases, or the like. A micro-market may include a point of sale (POS) system, which may include one or more payment kiosks. A retail space may include one or more storage areas, including without limitation warehouses, stockrooms, "back rooms," and or cases or shelving dedicated to storage rather than display, such as shelving set higher than display shelving, chests, trunks, boxes, and/or cabinets with additional stock, or the like.

Still referring to FIG. 2, a retail space 200 may include at least an inventory system. At least an inventory system may include a protocol for storage and display of products; at least an inventory system may include locations for storage and display as described above. At least a inventory system may include a system for tracking and locating items placed in storage and/or display, including an electronic inventory system; an electronic inventory system may include one or more data structures, as discussed in further detail in this disclosure, which may store and be used to retrieve data describing quantities and display and/or storage locations of one or more items in retail space, where one or more items may include products to be sold, display elements such as signage, modular shelving components, and the like which may be moved and/or modified to reflect changes in product placement and/or display, or the like. Electronic inventory system may be included in, and/or communicate with, a planogram as described in this disclosure; for instance, a planogram may be extended to include storage spaces as described above, to include display elements, or the like. Electronic inventory system and/or inventory system may be used to track information about a single retail space or multiple retail spaces; for instance all retail spaces operated by a particular entity in a given geographical region, or in all geographical regions, may be tracked by inventory systems, for instance in data structures that send data to and/or receive data from any or all such retail spaces. Method steps updating and/or retrieving data from POS and/or planogram information may alternatively or additionally update and/or retrieve data from an electronic inventory system. Inventory systems may track sales of products based on their shelf location, such as without limitation high/low, corner vs. middle of a display, or the like, and specific retail location patron buying patterns. As a non-limiting example, hospital employees may buy differently than construction workers, or rural locations may have different buying patterns than urban locations; inventory systems may track sales patterns at each location, and/or differences between such sales patterns. Inventory systems may track buying patterns based on time of year, holidays, special occasions, or the like. In an embodiment, combination of system 100 with an inventory system may confer advantages such as without limitation greater specificity regarding shelf and/or position information of products, easier updating of such data, and/or greater access for users and/or retail space personnel to inventory system information via methods and/or system elements as described in this disclosure.

Still referring to FIG. 2, retail space may include one or more product display structures 204, which as used herein include any structure or structures used for display of products for sale, including without limitation shelving, pegboards, display cases, beverage cases, refrigerated cases, platforms, hangers, or the like. Persons skilled in the art, upon reviewing the entirety of this disclosure, will be aware of various different structures that may function as product display structures 204 as described herein. At least a first transmitter 112 may be locate at a product 208, which may include any item sold in a retail space. Location at a product 208 may include attachment to the product 208 and/or attachment at or near a location where the product 208 is placed on or in display structure 204. One or more additional and/or second transmitters 212 may be located at one or more other locations on or in display structures 204, and or one or more other products. In an embodiment, and as described in further detail below, a product 208 may be moved from a first location, including a location of at least a first transmitter 112, to a second location, which may be a location of a second and/or additional transmitter 212. This may be performed, without limitation, in conjunction with or as instructed by an updated planogram as described below, or otherwise as dictated, for instance, by a decision made by a manager or other person associated with retail space 200.

Referring again to FIG. 1, a spatial information data structure 116 may be included in and/or communicate with system. Spatial information data structure 116 may include any data structure describing locations of products 208, display structures 204, at least a first transmitter 112, and/or one or more additional and/or second transmitters 212 in retail space 200; spatial information data structure may include or be implemented with any database, datastore, and/or data structure suitable for use in storage and/or retrieval of data. Spatial information data structure 116 may include or link to a map. Map may be an electronic or virtual map. Virtual map may contain the dimensions of retail space 200. Virtual map may contain location of at least a first transmitter 112 within a retail space 200. Virtual map may contain location of a second transmitter within a retail space 200. Virtual map may contain locations of architectural features within the retail space 200. Virtual map may contain locations of user features 212 within the retail space 200.

With continued reference to FIG. 1, virtual map may include one or more coordinate systems to aid in orientation and location detection and route calculation. The coordinate system may include a Global Coordinate System (GCS); in some embodiments, the GCS is a coordinate system orienting and locating retail space 200, users, and features to a global set of axes. The global axes may be directional axes used to navigate the surface of the Earth, such as latitude and longitude. For example, a first global axis, which may be labeled the Y axis, may be oriented north-south, with north being the direction of the positive Y axis and south the direction of the negative Y axis. Likewise, a second axis, which may be the X axis, may be oriented east west, with east in the direction of the positive X axis and west in the direction of the negative X axis. Up and down may correspond to a third axis, which may be the Z axis, with up positive for the Z axis and down negative for the Z axis.

Still referring to FIG. 1, in some embodiments, coordinates may include a User Coordinate System (UCS) for each retail space 200. The UCS for a given retail space 200 may have an origin point at a fixed location within the retail space 200; for instance the origin point may be located at the strike or handle side of the entrance door of a room. The UCS may have three axes that span three dimensions. As a non-limiting example, a first axis, which may be the Y axis of the UCS, may be oriented in a first horizontal direction. In some embodiments, the first horizontal direction is a direction that is relatively simple to determine from location of the origin and the physical characteristics of the surrounding features; for instance, where the origin is located at a door in the retail space 200 or at a wall of the retail space 200, the Y axis may be perpendicular to the door or wall. The direction along the Y axis projecting into the retail space 200 may be positive. Further continuing the example, the UCS may include a second axis, which may be the X axis, in a second horizontal direction such that the Y and X axes together span the horizontal plane; the X axis may be perpendicular to the Y axis. The X axis may be aligned in a direction determinable by the physical characteristics of the features near the origin of the UCS; for instance, where the Y axis is perpendicular to a wall or door, the X axis may be parallel to the wall or door. The UCS may include a third axis, which may be the Z axis, such that the Y, X, and Z axes together span three dimensions; the Z axis may be perpendicular to the Y and X axes, and thus vertical. In some embodiments, up is in the positive direction on the Z axis. Each UCS may have a specific relationship to the GCS that can be transposed when appropriate.

Continuing to refer to FIG. 1, in some embodiments, where one of at least a first transmitter 112 has a fixed location, at least a first transmitter 112 with the fixed location has its own UCS. The first transmitter location may be the UCS origin. The UCS axes may be selected as described above. For instance, perpendicular to and into the face of the (wall mounted or feature mounted) fixed first transmitter may be a positive Y axis communicated to the user as "straight ahead". A positive X axis may be 90 degrees to the right of the Y axis and may be communicated to the user as to the right. The first transmitter UCS may have a specific relationship to its parent UCS and thus to the GCS. In some embodiments, the communications to the user are for the user when facing the first transmitter (e.g., straight ahead, to the left, to the right turn around and proceed).

Still referring to FIG. 1, in some embodiments, the regional descriptive data is stored using Building Information Modeling (BIM). In some embodiments, in a BIM, not only physical attributes such as location and size are stored, but any information about any feature (or space) is stored, including any features as described above, such as without limitation architectural features, free-standing user features, user features, and the like. BIM is a common term in the CAD world of the construction industry. As a non-limiting example, BIM data for a give user feature 212, architectural feature, or retail space 200 may include the X, Y and Z coordinates in a UCS, as described above. In some embodiments, this allows the calculation of distance to any other features UCS, even if that other feature is not in virtual map. The BIM data may include the orientation of the feature, with regard to the UCS, where orientation describes the tilt of a feature relative to a particular UCS plane. The BIM data may include a path tree connecting the feature to one or more other features as described above. Path tree may or may not describe a shortest distance between objects; for instance, path tree may describe a path to avoid obstacles such as walls or furniture. There may also be multiple paths to provide alternate routes to avoid features such as stairs. The BIM data may include attributes of the feature, including without limitation the name and type of space (or subspace) in which the feature is located, the type of feature (e.g. toilet, sink, dryer, checkout counter, elevator), the operation (e.g. flush valve, nozzle, motion sensor, location of operation (e.g., top of countertop, wall, fixture mounted, free standing), material covering surfaces (e.g. tile, carpet, stone, wood, or paint), color or distinguishing marks, or floors to which an elevator will travel, manufacturer information including warrantees, materials, methods used to produce, specifications, cleaning instructions, operation, replacement parts, and the like. BIM attributes may similarly be stored in an object-oriented data structure so that the attributes reference other databases and/or data structures. Part or all of virtual map may be stored at portable computing device 104 or at a remote device 120; a relevant portion of virtual map and/or regional descriptive data may be downloaded as needed, and as further described below in reference to FIG. 4.

With continued reference to FIG. 1, spatial information data structure 116 may include one or more computer-assisted design (CAD) models of spaces, including without limitation retail spaces 200, and/or objects. In an embodiment, a CAD model may be used in the initial design of a retail space 200, if retail space 200 was built; CAD model may be updated upon rebuilding and/or remodeling of retail space 200. CAD model may be updated with new elements, such as movable objects 220 or the like. User entries or other changes as described in further detail below may update augment, and/or overwrite one or more portions of CAD model; for instance and without limitation, location data pertaining to one or more movable objects 220 may be updated in CAD model.

With continued reference to FIG. 1, spatial information data structure 116 may include a table or similar structure linking unique identifier to a location in virtual map. Spatial information data structure 116 may include a representation of retail space 200. Representation of data in retail space 200 may itself include a plurality of data elements that define specific spaces, such as departments, aisles, shelves/display structures 204, locations on shelves/display structures 204, or the like. This may be accessed by arrangement and traversal of a tree, or other data structure enabling recursive, linked, or serial enumeration of data structures. If portable computing device 104 determines a user's current location in any retail space 200 within any parent retail space 200, specific information can be communicated to navigate to any other space within the parent retail space 200, as all the origin points are connected according to the data representations. The representation of each retail space 200 may include an exit/entry point corresponding to a physical exit/entry point for the retail space 200. Location of a retail space 200's origin point, or exit/entry point may be stored in the data representation of the parent space, or in a tree structure one node higher in the tree structure. In some embodiments, the exit/entry point of a given space must be traveled through physically to access data corresponding to the space (upon entry) or data corresponding to parent or sibling spaces (upon exit). Location information within spatial information data structure 116 may follow, or be organizable into, an ordered description of a location of a given product 208 and/or transmitter such as first transmitter 112 and/or second and/or additional transmitter 212; as a non-limiting example, such a location may be described or describable in terms of a department and/or aisle location within retail space 200, a shelving unit within retail space, department, and/or aisle location, a shelf on shelving unit, which may be described in order and/or enumeration from top to bottom or bottom to top, and/or a location along a shelf such as a location as traversed from left to right and/or from right to left. Such information may be used to provide directions to a product and/or transmitter as described in further detail below.

In an embodiment, and still referring to FIG. 1, spatial information data structure 116 may include and/or communicate with a planogram 120. A planogram 120, as used herein, is a data structure describing locations of products within a retail space 200, including without limitation location of products on display structures, at particular locations such as locations suitable for use as locations of at least a first transmitter 112 and/or one or more additional transmitters 212, or the like. A planogram may incorporate, communicate with, and/or be incorporated in any spatial information data structure 116 and/or map as described above; for instance, a planogram 120 may include one or more two- or three-dimensional displays of retail spaces 200, display structures 204, or the like, and may include three-dimensional representations of products placed thereon. In an embodiment, a user interacting with a planogram 120 may be able to see a visual representation of how a given product might fit in a given location, what it might look like to a customer at retail space 200, degree of visibility of the product, and/or any other information that might be useful in deciding how to place a product in a retail space. Employees and/or proprietors of retail space 200 may use planogram 120 to locate current locations of products, to move products to new locations based on updates to planogram 120, to replace misplaced products, and/or to restock products at appropriate locations. Planograms 120 used in or with system 100 may be updated and/or used, without limitation, as described in further detail below.

Continuing to refer to FIG. 1, system 100 may include and/or communicate with a product data structure 120. Product data structure 120 may include any data structure suitable for use as spatial information data structure 116 and/or any combination of such data structures. Product data structure 120 may include any information and/or data describing products and/or product data as described in further detail below.

Still referring to FIG. 1, system 100 may include and/or communicate with a user data structure 128. User data structure 128 may include any data structure suitable for use as spatial information data structure 116 and/or any combination of such data structures. User data structure 128 may include any information and/or data describing and/or corresponding to users as described in further detail below, including without limitation user roles, group information, access levels, identity, name, contact information, demographic information, account information, or the like.

Continuing to refer to FIG. 1, persons skilled in the art will be aware that the elements described above may be organized in other manners than in the object form described, as data may be organized in various ways depending on the programming language, protocols, or storage methods used, and other considerations; for instance, a relational database may arrange the data corresponding to each retail space 200 in any manner using interrelated tables according to the dictates of efficient information storage and retrieval. Furthermore, information may be transferred from one form to another as convenient to the operation of the system; for instance, a single node in a tree structure corresponding to the retail space 200 most immediately occupied by the user may be stored in a at least a first transmitter within that space or may be conveyed to the receiver over the network in network packet form. Furthermore, the data may of course be stored according to any registry or other memory storage protocol within particular computing devices. Part or all of spatial information data structure 116 may be stored at portable computing device 104 or at a remote device 120 such as a server or the like; a relevant portion of spatial information data structure 116 may be downloaded as needed, and as further described below in reference to FIG. 4. Still referring to FIG. 1, system 100 may include a user output device 132. User output device 132 may include a display 136; the display 136 may be any display as described below in reference to FIG. 4. The display 136 may be the display of a mobile device such as a smartphone or tablet. User output device 132 may include an audio output device, such as a speaker, headphones, or a wireless headset such as those typically paired to a mobile device. User output device 132 may include a tactile output device. In some embodiments, tactile output device is a device that outputs information that is intelligible using the sense of touch. Tactile output device may include a haptic output device such as a vibrator of a mobile device such as a smartphone, cellular phone, or tablet. In some embodiments, tactile output device produces patterns having geometric forms that are intelligible to the user using the sense of touch; for instance, tactile output device may output letters in braille using a set of retractable pins or bumps that can be extended and retracted to form braille characters, similarly to devices used with screen readers. Tactile output device may output other recognizable shapes, such as directional arrows or geometric forms; tactile output device may, as another example, output a map vignette of the immediate area including user features 212 or any user feature 212 data as described above. User output device 132 may be coupled to a mobile device; for instance, where portable computing device 104 includes a mobile device, user output device 132 may be coupled to the same mobile device. User output device 132 may be incorporated wholly or in part in a mobile device; for instance, user output device 132 may include the display 136 and speakers of the mobile device, as well as a tactile output device coupled to the mobile device. User output device 132 may be coupled directly to wireless receiver 108 and/or portable computing device 104 or may communicated with wireless receiver 108 and/or portable computing device 104 via a network; user output device 132 may be incorporated in or include a computing device and/or any element thereof, including without limitation a processor, wireless or wired communication input/output devices, navigation facilities, and the like. User output device 132 is configured to receive data from portable computing device 104; data may be received from portable computing device 104 by any suitable electronic or wireless means. User output device 132 is configured to provide the received data to the user. In some embodiments, providing data signifies presenting the data to the user in a form in which the user can understand the data; for instance, if the user has some visual impairment but is capable of reading large type or similarly accentuated directional features such as large directional arrows, providing data may include displaying large type on a display 136, such as a mobile phone or tablet screen, or displaying large symbols such as directional arrows on the display 136. Similarly, if the user is visually impaired but able to hear, providing data may involve presenting the data by means of an audio output device. Where the user is not able to see or hear, presenting the regional descriptive data may include providing data using a tactile device. Providing data may also involve a combination of the above-described means; for instance, the regional descriptive data may be presented to the user in audio form, combined with large displays of directional arrows or type, or with tactile information. User output device 132 may also be able to output content data. User output device 132 may also be able to output product data.

Continuing to refer to FIG. 1, portable computing device 104 may include additional components. For instance, portable computing device 104 may include an inertial measurement unit (IMU). IMU may be an electrical component that detects the motion of the wireless receiver 108. IMU may include, an accelerometer (not shown). IMU may include a plurality of accelerometers disposed to detect acceleration in a plurality of directions; for instance, three accelerometers disposed in three directions spanning three dimensions may be able to detect acceleration in any direction in three dimensions. IMU may include one or more gyroscopes. IMU may include a plurality of gyroscopes disposed to detect rotation about a plurality of axes; for instance, three accelerometers having axes spanning three dimensions may be able to detect acceleration in any direction in three dimensions. IMU may have both accelerometers and gyroscopes. IMU may have any other component or components capable of detecting linear or rotational motion. In some embodiments, IMU can determine substantially precisely the direction and magnitude of motion of the wireless receiver 108 relative to an initial reference frame and location; where the wireless receiver 108 is initially stationary, IMU may enable the wireless receiver 108 to determine substantially accurately any change in orientation or position of the receiver. In other embodiments the receiver is coupled to an IMU; for instance, where the receiver is coupled to a computing device such as a smartphone or tablet, the computing device may have an IMU.

Still viewing FIG. 1, portable computing device 104 may include a navigation facility (not shown), defined as any facility coupled to the computing device that enables the device accurately to calculate the device's location on the surface of the Earth. Navigation facilities may include a receiver configured to communicate with the Global Positioning System or with similar satellite networks, as well as any other system that mobile phones or other devices use to ascertain their location, for example by communicating with cell towers. Portable computing device 104 may use beacons for navigation, for instance determining its location by direction and strength of one or more beacon signals; directional information may be received as part of beacon signals. Beacons transmitting beacon signals may be calibrated by portable computing device 104, or by multiple such devices, as set forth in further detail below. Navigational means may include a compass, which may be any device capable reporting orientation to the points of the compass (e.g. North, South, East, West, and the like) of portable computing device 104, for instance and without limitation by sensing a magnetic field of the Earth.

With continued reference to FIG. 1, system 100 may include and/or communicate with a user tag 140. User tag 140 may include any device suitable for use as at least a first transmitter 112 as described above. User tag 140 may be owned and/or operated by a user, who may enjoy access rights to user tag 140 such as ability to write to and/or overwrite the tag, to attach the user tag 140 to an item of user's choosing, or the like. User may carry user tag 140 on person of user, keep user tag 140 in a vehicle, residence, workplace, or other user-associated location, or the like. User may update a data structure on a user device and/or remote device with information concerning an identifier of user tag 140, which may include a unique identifier as described above; for instance, user may enter one or more instructions that may associate user tag 140 with one or more elements of product information as described in further detail below.

Still referring to FIG. 1, system 100 may include and/or communicate with a POS system 144. In an embodiment, a POS system 144 is a system that electronically performs sale transactions in a retail space 200. A POS system may include at least a computing device that receives payment data and/or product data pertaining to sale of a product. Payment data may include, without limitation, an amount of a currency paid to effect a purchase of a product, a form and/or category of payment such as, without limitation, credit card payment, debit card payment, drafts such as personal checks, cash, mobile pay, or the like. Payment data may include one or more account identifiers and/or account numbers, including without limitation credit card numbers, bank account numbers, account identifiers used for mobile pay, or the like. Product data may include any data to identify any product as described in this disclosure, including without limitation UPC data. Additional data may include sale data concerning a transaction such as a quantity of products purchased, a list of prices paid, a total price paid, a time, date, and/or timestamp indicating when the purchase tool place, or the like. Additional data may include identification of a purchaser, such as without limitation a name, date of birth, social security number, identifier and/or identity within a sales tracking and/or loyalty program, or the like. Persons skilled in the art, upon reviewing the entirety of this disclosure, will be aware of various ways in which data, including without limitation data described in this disclosure, may be incorporated in, linked to, or otherwise associated with a POS system 144.

With continued reference to FIG. 1, a POS system 144 may include one or more devices that perform a sales transaction, including without limitation cash registers, automated kiosks, vending machines, or the like. POS system 144 may include one or more wireless transmitters and/or receivers to perform payment via wireless connection, such as without limitation mobile payments. POS system 144 may include one or more card readers such as wireless, magnetic stripe, and/or chip-based credit or debit card readers.

Still viewing FIG. 1, any change to data in inventory tracking systems, planograms, and/or other data structures described in this disclosure may be performed in POS system 144 as well, or vice-versa. For instance, and without limitation, where POS system 144 records a sale of a product, a data structure such as product data structure 124 may register that the product has been sold, for instance, by decrementing a quantity of that product available for sale; returns recorded in POS system 144 may similarly be reflected in an incrementation of an amount of a product available for sale. As a further non-limiting example, a sale recorded or performed in POS system 144 may occasion an update to information in a planogram 120, including without limitation decrementing an amount of a product recorded in the planogram 120 as placed on a product display or shelving unit, or the like. POS system 144 may be updated with product placement, pricing, availability, and/or quantity information as recorded in any other data structures described herein; for instance, where planogram 120, product data structure 124, and/or inventory tracking system is updated to indicate arrival of new products and/or placement thereof in retail space 200, POS system 144 may be updated to record the new information. Persons skilled in the art, upon reviewing the entirety of this disclosure, will be aware of various ways in which a POS system 144 may update and/or be updated by data structures of and/or in communication with system 100 as described in this disclosure.

Still referring to FIG. 1, system 100 may include and/or communicate with at least a remote device 148. At least a remote device may include, without limitation, any device suitable for use as or in POS system 144 and/or any device suitable for use as portable computing device 104. At least a remote device may include one or more devices at one or more geographical locations; for instance, there may be a remote device 148 geographically near to retail space 200, another remote device 148 geographically distant from retail space and near to another retail space 200, a remote device 148 that is not near to any retail space, or the like. At least a remote device may include a remote device in or at retail space 200; remote device 148 at or in retail space may include a device in connection with a local area network (LAN) of local retail space, which may enable portable computer device to access remote device 148 even when connection to a wide area network (WAN) such as the Internet is interrupted. Any remote device 148 of at least a remote device 148 may include and/or store on memory thereof any data structure described in this description, and/or a local instance and/or copy of any data structure described in this description; copy may be an entire copy or a partial copy. For instance, and without limitation, a remote device 148 at or in a retail establishment may have portions of and/or entireties of one or more data structures containing data concerning contents of, layout of, and/or products or other items within retail space 200.

Figure 3:
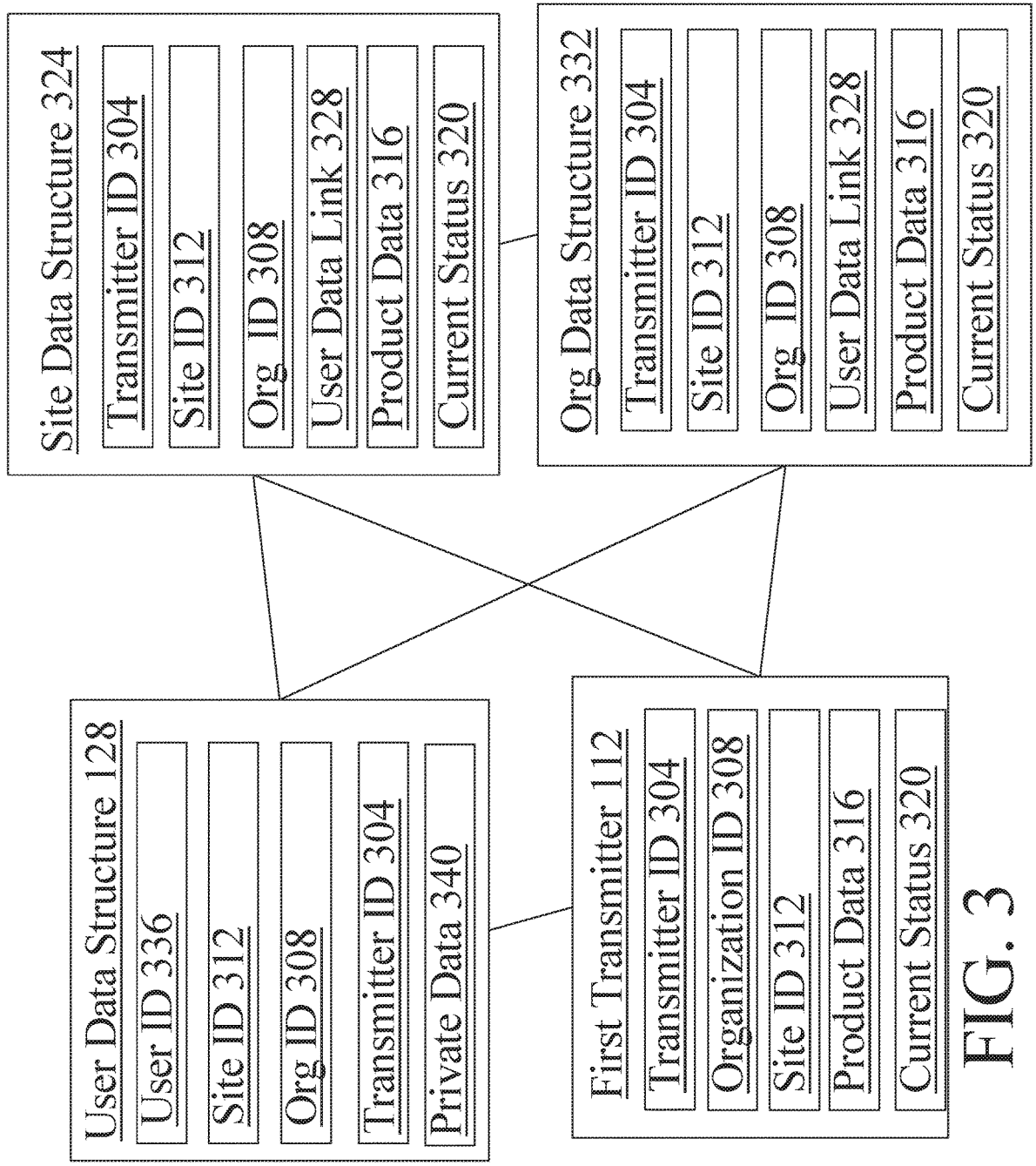
FIG. 3 is a block diagram illustrating exemplary embodiments of data structures that may be used in disclosed embodiments.

Referring now to FIG. 3, exemplary embodiments of certain data structures that may be included and/or used within system 100 are illustrated. Information on first transmitter 112 may include a plurality of textual elements. Information on first transmitter 112 may include, without limitation, a first identifier that is a transmitter identifier 304; first identifier may be included in a plurality of textual elements. Transmitter identifier 304 may include any unique identifier of a transmitter as described above, including without limitation a GUID or UUID. Alternatively or additionally transmitter identifier may be unique to a class, lot, or group of transmitters. Information on first transmitter 112 may include, for instance as part of a plurality of textual elements, at least a second identifier. At least a second identifier may include at least one of a site identifier and/or an organization identifier; for instance, at least a second identifier may include a site identifier, an organization identifier, both a site identifier and an organization identifier, or neither. At least a second identifier may include either or both of an organization identifier and a site identifier as well as any other identifier as described in this disclosure. At least a second identifier may include any identifier described herein, any two identifiers described herein, and/or a combination of three or more identifiers. Any identifier suitable for use as at least a second identifier may alternatively or additionally be retrieved using another identifier in plurality of textual elements. For instance, and without limitation, a site identifier may be retrieved from any data structure described in this disclosure using a transmitter identifier and/or an organization identifier, an organization identifier may be retrieved from any data structure described in this disclosure using a transmitter identifier and/or a site identifier, or the like.

Transmitter may include an organization identifier 308, which as used herein is an identifier of an entity operating and/or responsible for transmitter; organization identifier 308 may be implemented in any manner suitable for implementation of transmitter identifier 304. Organization identifier 308 may pertain to an organization and/or entity operating retail site 200 and/or to an organization and/or entity that does not operate retail space 200. For instance, a certain lot of transmitters may be operated by a vendor or sub-contractor at retail space 200 and may contain organization identifiers 308 relating to that vendor or sub-contractor.

Still referring to FIG. 3, information on first transmitter may include a site identifier 312, which may identify a retail space location, department, regional division and/or arrangement of an entity operating retail space, or the like. Site identifier 312 may be implemented in any manner suitable for implementation of transmitter identifier 304. In an embodiment, site identifier 312 may be used in combination with organization identifier 308 to distinguish entities or persons in charge of and/or responsible for first transmitter 112 from entities and/or persons in charge of retail space 200 or other area associated with site identifier 312. For example, where organization identifier 308 pertains to an organization that does not operate site identifier 312 may relate to a proprietor of the site; the proprietor may be operating one or more elements of spatial information data structure and/or planogram, may be connected to a different organization identifier 308. As another example, site identifier 312 may link to one set of spatial info data for the establishment, while organization identifier 308 may link to another for a display area, display case, or the like, or vice-versa. This may permit overall planogram updates, localized planogram updates, stock storage and/or rearrangement of overall spaces and/or localized spaces to be managed by persons and/or entities in charge of them, and may aid in coordination of such actions while allowing each entity to maintain control over its respective goods, display areas, storage areas, or other possessions. As set forth in further detail herein, first transmitter 112 may include additional fields and/or data, including without limitation product data 316 and/or current status data 320.

With continued reference to FIG. 3, system 100 may include and/or communicate with a site data structure 324. Site data structure 324 may be implemented in any manner suitable for implementation of spatial information data structure 116, product data structure 124, user data structure 128, or the like. Site data structure may be used to store data pertaining to retail space 200 and/or other site containing transmitter 112 and/or retail space 200. Site data structure 324 may include at least a field for site identifier 312; in an embodiment, site identifier 312 field may be included in and/or linked to records and/or rows in tables of site data structure 324 such that a query including site identifier 312 may retrieve records, rows, and/or other elements of data relating to a site identified by site identifier 312, such as without limitation retail space 200. Alternatively or additionally, an instance and/or copy of site data structure 324 may include only records associated with a particular site identifier 312; for instance, a copy and/or instance of site data structure 324 deployed on and/or downloaded to a remote device 148 located at retail space 200 may contain only records related to and/or linked to a site identifier 312 of that retail space. A site identifier 312 may double in such circumstances as an identifier of a site data structure 324 containing records linked to that site identifier 312, which devices in system 100, such as POS devices and/or portable computing device 104 may use to look up and/or locate an instance of such a site-specific site data structure 324. Alternatively or additionally, any site data structure 324 and/or portion thereof may be downloaded to portable computing device 104, for instance as described in further detail below.

Still referring to FIG. 3, site data structure 324 may include one or more fields that are useable to identify other components, objects, and/or identifiers within system. Fields may include a field to contain site identifier 312; for instance any site identifier 312 in site data structure 324 and/or records associated therewith may be further linked to and/or included with an organization identifier 312 of an entity associated therewith. Fields may include a field to contain a transmitter identifier 304, for instance and without limitation linking in a table or other element of site data structure 324 a list of transmitter identifiers 304 associated therewith; transmitter identifiers may be further associated with product and/or planogram data as described in further detail in this disclosure. Fields may include a user data link 328 field, which may contain one or more elements of data suitable for association with a user and/or user data, such as without limitation user data structure 128; examples of data that may be maintained in user data link 328 field may include a user identifier, which may be implemented in any way suitable for implementation of transmitter identifier 304. User data as listed in site data structure 324 may also include organization role information, which may be linked to user data link field 328. Alternatively or additionally, such role information may be linked to a combination of identification fields, such as a combination of organization identifier 308 with user data link field 328, site identifier 312 with user data link field 328, or the like; combination may include, without limitation, concatenation. As a further example of combination, an owner identifier, usable to link to data describing a person and/or entity responsible for a site, may be a combination of site identifier 312 and organization identifier; this may be computed by portable computing device 104 or other devices reading this material, sparing space on transmitter, for instance. Other such combination identifiers may be employed, as may occur to persons skilled in the art upon reviewing the entirety of this disclosure.

Continuing to refer to FIG. 3, site data structure 324 may include and/or link to one or more data structures and/or data describing site-specific data, such as without limitation product data structure 124, spatial information data structure 116, and/or planogram 120. Such information may be linked to site identifier 312 as described above. Some such data may be private and/or limited in access to particular persons and/or persons in particular roles; for instance, planogram 120 and/or data contained therein may be visible only to employees of an entity operating retail space 200 or the like. Other data may be publicly visible but editable only by persons having such access; for instance, product data and/or data included in and/or linked to product data structure 124 may be visible generally to users such as customers, but editable only by employees of an entity operating retail space 200 or the like. Public information and/or authorized private information may be retrieved by a user via a user device; user device may determine data associated with retail space 200 using site identifier 312, may query using product identifier and/or a transmitter identifier 304 or the like. As a further non-limiting example, public information for a given retail space 200 may be looked up and/or retrieved using one or more organization identifiers 308. For instance portable computing device may receive data from a transmitter 112 in one geographical location having an organizational identifier 308, then may arrive at a different geographical location, and may find at least a local site identifier 312 of a site at or near the different geographical location that is associated with the organization identifier 308, which may be retrieved, for instance from an organization data structure as described in further detail below.

With continued reference to FIG. 3, system 100 may include and/or communicate with an organization data structure 332. Organization data structure 332 may be implemented in any manner suitable for implementation of spatial information data structure 116, product data structure 124, user data structure 128, site data structure 324, or the like. Organization data structure 332 may be used to contain information pertaining to an organization that operates retail space 200 and/or transmitter 112. Organization data structure 332 may include at least a field for organization identifier 308; in an embodiment, organization identifier 308 field may be included in and/or linked to records and/or rows in tables of organization data structure 332 such that a query including organization identifier 308 may retrieve records, rows, and/or other elements of data relating to an organization identified by organization identifier 308, such as without limitation an organization operating retail space 200. Alternatively or additionally, an instance and/or copy of organization data structure 332 may include only records associated with a particular organization identifier 308; for instance, a copy and/or instance of organization data structure 332 deployed on and/or downloaded to a remote device 148 located at retail space 200 may contain only records related to and/or linked to an organization identifier 308 of an entity operating that retail space. Alternatively or additionally, any site data structure 324 and/or portion thereof may be downloaded to portable computing device 104, for instance as described in further detail below. An organization identifier 308 may double in such circumstances as an identifier of an organization data structure 332 containing records linked to that organization identifier 308, which devices in system 100, such as POS devices and/or portable computing device 104 may use to look up and/or locate an instance of such an organization-specific organization data structure 332.

Still referring to FIG. 3, organization data structure 332 may include one or more fields that are useable to identify other components, objects, and/or identifiers within system. Fields may include a field to contain a site identifier 312; for instance any site identifiers 312 in organization data structure 332 and/or records associated therewith may be further linked to and/or included with an organization identifier 312 of an entity associated therewith, and thus useable to identify and/or retrieve records from a related site data structure 324. Fields may include a field to contain a transmitter identifier 304, for instance and without limitation linking in a table or other element of organization data structure 332 a list of transmitter identifiers 304 associated therewith. Fields may include a user data link 328 field, which may contain one or more elements of data suitable for association with a user and/or user data, such as without limitation user data structure 128; examples of data that may be maintained in user data link 328 field may include a user identifier, which may be implemented in any way suitable for implementation of transmitter identifier 304. User data link 328 field and/or data used therewith may be used as described above for site data structure 324.

In an embodiment, and continuing to refer to FIG. 3, product information data may include one or more elements of information provided by manufacturers of products. For instance, site data structure, organization data structure, and/or one or more other data structures described in this disclosure may contain information received from a manufacturer; alternatively or additionally a remote device 148 and/or portable computing device 104 may receive one or more elements of data from a manufacturer device, which may include any device suitable for use as a remote device 148, and/or from a manufacturer data structure, either of which may be exterior to system. A manufacturer data structure and/or device may be referred to from a list of products sold at each location or organization. For instance, either or both of site data structure 324 and organization data structure 332 may contain data linking products, sets of products, and/or transmitter identifiers, to one or more manufacturer data structures and/or devices, from which portable computing device 104, a remote device 148, or the like may retrieve product information data.

Still referring to FIG. 3, one or more of site data structure 324, organization data structure 332, and/r other data structures as described in this disclosure may include data, such as site-specific data, to be used by people that are blind or visually impaired. Such data may be provided by an organization that is the "owner" of the transmitter, but it may also be provided by an outside organization the "owner" organization gives permission. In an embodiment, this may enable a group such as the National Federation of the Blind (NFB), American Council of the Blind (ACB), American Foundation for the Blind (AFB) or others to add navigational information that sighted users do not need nor want to see on their display. A user may be able to enable receipt of such information by portable computing device 104, for instance as permitted by credentials such as membership in one of the above-described organizations and/or groups. Additional site-specific information such as obstacles, smells or sounds nearby, and/or navigational instructions may be provided to portable computing device 104 and/or to user via portable computing device 104, to aid a blind and/or visually impaired user in navigation and/or use of retail space 200.

Continuing to refer to FIG. 3, user data structure 128 may include a user identifier 336, which may be implemented in any way suitable for implementation of transmitter identifier 304. User identifier 336 may be included in and/or linked to data records containing data of, entered by, and/or describing a user. User data structure 128 may include multiple users; for instance, a table may list user identifiers 336 and/or other user information for a plurality of users. Alternatively or additionally, user data structure 128 and/or a copy or instance thereof may contain data only relating to a single user, such as without limitation a local instance loaded to portable computing device, 104 for a given user, which may be created by querying a table of user identifiers 336 and elements from other tables or structures in user data structure 128 linked to user identifier 336; such a query result may be retrieved as a user-specific user data structure 128.

Still referring to FIG. 3, user data structure may include one or more fields that are useable to identify other components, objects, and/or identifiers within system. Fields may include a field to contain a site identifier 312; for instance user data structure 128 records may include site identifiers 312 identifying a retail space 200 or other site at which a particular transaction and/or series of transactions involving a user identified by a user identifier 336 and/or a portable computing device 104 operated thereby occurred. Fields may include a field to contain a transmitter identifier 304, for instance user data structure 128 records may include transmitter identifiers 304 identifying transmitters at or with which a particular transaction and/or series of transactions involving a user identified by a user identifier 336 and/or a portable computing device 104 operated thereby occurred. Fields may include an organization identifier; for instance user data structure 128 records may include organization identifier 308 identifying an entity operating a retail space 200 or other site at which a particular transaction involving a user identified by a user identifier 336 and/or a portable computing device 104 operated thereby.

Continuing to refer to FIG. 3, user data structure 128 may be used to store private data 340. Private data 340 may be kept and/or updated locally at portable computing device 104, remotely at one or more remote devices 148, and/or both; for instance one device may be updated by the other, such as updates regarding user activity and/or changes in product data, data concerning transmitter identifier 304, site identifier 312, and/or organization identifier 308 being provided for a user linked to user identifier 336 at any remote device and subsequently transmitted to portable computing device 104 and/or other locations having instances of such data, and/or data entered by a user at portable computing device 104 and/or generated by portable computing device 104 during any process as described in this disclosure may be transmitted to remote devices 148, POS systems. Private data 340 may be linked to and/or related to transmitter identifier 304, site identifier 312, and/or organization identifier 308, where portable computing device 104, remote device 148 and/or POS device may automatically or at user direction associate private data 340 with such identifiers upon performing a process as described herein involving a transmitter 112, site such as without limitation retail space 200, and/or organization as described in this disclosure.

Still referring to FIG. 3, access to private data 340 may be restricted to users and/or devices presenting user logon credentials. Alternatively or additionally, a user may make one or more elements of private data 340 available to specific other users, groups of users, and/or to the public. User may, for instance make reviews of and/or helpful tips concerning products, retail space 200, other sites, and/or organizations available to the public; users and/or portable computing device 104 may be able to download and/or view multiple user reviews, tips, and/or numerical ratings such as "star ratings" from user data structure 128 and/or instances thereof. Such data may alternatively or additionally be transmitted to and/or stored in other data structures of system 100, such as without limitation product data structure 124, site data structure 324, organization data structure 332, or the like; such data may be part of product information data as used in processes and/or process steps described herein.

With continued reference to FIG. 3, read access and/or write access to any data on any of the above described data structures may be publicly available, available to specific users, and/or available to users according to role-based credentials. Data may be retrieved, modified, and/or otherwise manipulated on any of the above-described data structures using any combination of the above-described data fields and/or data elements as queries.

Referring again to FIG. 1, portable computing device 104 may be configured to perform any method and/or method steps described in this disclosure in any order. Portable computing device 104 may be configured to repeat any method or method steps described in this disclosure two or more times; iterations may use data and/or states established by previous iterations. Iterations may ignore or reset states or previous iterations. As an example, and without limitation, portable computing device 104 designed and configured to wirelessly receive a signal from a first transmitter located at a product in a retail space, parse the first signal for plurality of textual elements, retrieve, based on the plurality of textual elements, product information datum relating to the product, and display the product information datum to the user, as described in further detail below.

Figure 4:
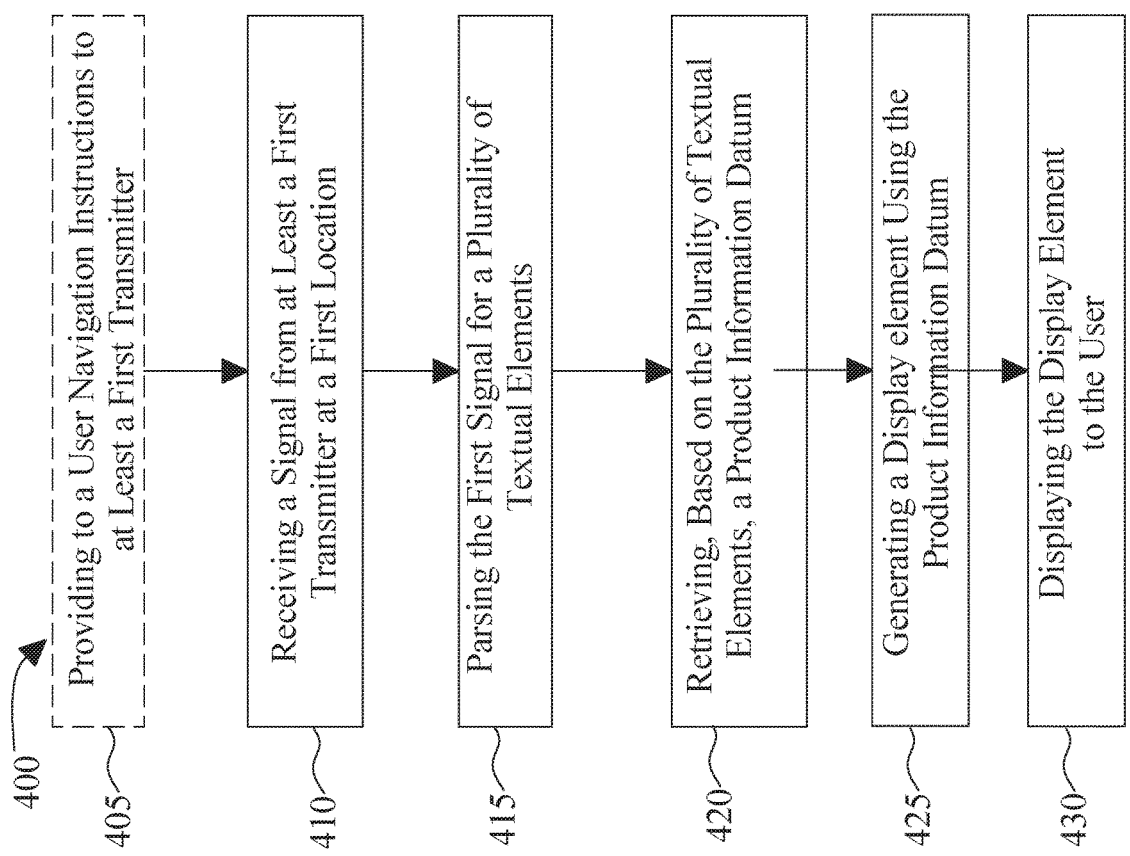
FIG. 4 is a flow diagram illustrating an exemplary embodiment of a method of wireless acquisition and presentation of local spatial information.

Referring now to FIG. 4, an exemplary embodiment of a method 400 of providing wireless guidance in a retail space is illustrated. At optional step 405, a portable computing device 104 operated by a user may provide to a user navigation instructions to at least a first transmitter 112. Portable computing device 104 may be any portable computing device 104 as described above in reference to FIGS. 1-2. Provision of navigation instructions may include determination of a current location of user, determination of a location of at least a first transmitter 112, and generation of one or more instructions for navigating from current location to location of at least a first transmitter 112. Where user is not in the same building and/or retail space as at least a first transmitter 112, generation of one or more instructions may include generation of instructions using a navigation facility of or in communication with portable computing device 104, as described above. Where user is in the same building and/or retail space as at least a first transmitter 112, generation of one or more instructions may be performed using data from a data structure such as spatial information data structure 116. In an embodiment, spatial information data structure may contain one or more sets of instructions describing how to navigate from a first point in building and/or retail space 200 to a second point, such as location of at least a first transmitter. One or more sets of instructions may include, as a non-limiting example, instructions to proceed a certain distance in an initial direction, turn right or left, proceed a second distance in a second direction, and the like. One or more sets of instructions may include instructions described in relative terms, such as instructions to go to a nearest shelf to the user and to proceed in a direction along that shelf until arriving at a subsequent shelf, or the like. Portable computing device 104 may append, to the one or more sets of instructions, instructions to proceed to an initial location listed in the one or more sets of instructions, such as a first display structure 204, entryway, or other "landmark" item or location in retail space 200. Instructions may further direct the user to a particular shelf, location on a particular shelf, or the like. Persons skilled in the art, upon reviewing the entirety of this disclosure, will be aware of various ways in which instructions from a first location in retail space 200 to a second location in retail space 200 may be generated consistently with this disclosure. Generation of navigation instructions may include generation on portable computing device 104 of one or more instructions, receipt of one or more instructions from a remote device and/or data structure, or a combination thereof.

Continuing to refer to FIG. 4, instructions may be generated based on a user instruction; for instance, a user may enter an instruction in portable computing device 104 to navigate to a product at which at least a first transmitter 112 is located. As a further non-limiting example, user may initiate a process to follow a recipe or other process involving one or more products in one or more retail space, as described in further detail below, and portable computing device 104 may generate navigation instructions as a result of that process. Instructions may be generated, as a non-limiting example, as part of a process to change a planogram and/or to rearrange products in retail space 200, as described in further detail below.

Still referring to FIG. 4, instructions may be based upon data such as planogram 120 data and/or other data stored in spatial information data structure 116. In an embodiment, instructions may, automatically and/or in response to a user entry, be made to a transmitter location associated with a previously encountered product, a product the user has entered a query for, or the like, for instance by retrieval from user data structure 128, which may track such past actions; where product has been moved and/or other information such as site identifier 312, transmitter identifier 304, organization identifier 308, or the like associated with the product has changed, index updates to user data structure 128 and/or other data may cause modification of such data in user data structure 128 or other data available and/or on portable computing device 104, permitting accurate modification to instructions.

With continued reference to FIG. 4, data from any of user data structure 128, organization data structure 308 and/or site data structure 312 may be loaded upon arrival at retail space 200; for instance, arrival and retail space 200 linked to a given site identifier 312 may prompt portable computing device 104 to download data associated therewith, including without limitation partial or entire instances of site data structure 324, organizational data structure, and/or user data structure 128, and/or data structures associated therewith and/or incorporated therein. This may be triggered automatically upon detection of user and/or portable computing device 104 entry at retail space 200 or other site, which may be accomplished using navigation means of portable computing device 104, such as without limitation GPS or the like, a beacon or other active transmitter at entrance that automatically transmits site identifier 312 to portable computing device 104 or the like. In an embodiment, such automated and/or user-directed download of data may permit subsequent process steps to be done locally upon entry, obviating need for direct network connection. Alternatively or additionally, portable computing device 104 upon such detection may switch from Internet based location of any data structure to localized and/or LAN-based communication with an in-space instance of any data structures as above. Data downloaded to portable computing device 104 may be specific to a localized transmitter, such as first transmitter 112; for instance, if first transmitter 112 is located in, at, or adjacent to a bakery department near bread items, ingredients for all bread items may be downloaded to the portable computing device 104 while only the name and locations of other bakery items may be downloaded. Similarly, data generated by portable computing device 104, such as without limitation display elements as described in further detail below, may include data concerning objects near to at least a first transmitter 112, including objects in the same display case, region of a retail establishment, aisle, department, and/or category of product. Such related data may further include data for recipes, ingredient lists, or the like, for instance as set forth in further detail below.

At step 410, and still referring to FIG. 4, portable computing device wirelessly receives a signal from a first transmitter located at a product in a retail space; reception may be performed using a wireless receiver 108; wireless receiver 108 may include any wireless receiver 108 as described above in reference to FIGS. 1-2. Reception of signal may be performed using wireless receiver 108, according to any means and/or methods as described above. For instance, and without limitation, first transmitter 112 may include a passive transponder, and receiving the first signal may include wirelessly transmitting, via an antenna of the wireless receiver 108, an interrogation signal providing electrical power to the first transmitter 112 and wirelessly receiving from the first transmitter 112, and via the antenna, a return signal. First transmitter 112 may be an active transmitter and/or transceiver, from which receiver may receive first signal without interrogation, and/or with or without first sending a signal to first transmitter 112; for example, first transmitter 112 may include a beacon, and receiving the first signal may include wirelessly receiving the signal from a beacon. Persons skilled in the art, upon reviewing the entirety of this disclosure, will be aware of various ways in which receiving the first signal may be accomplished consistently with this disclosure.

At step 415, and continuing to refer to FIG. 4, portable computing device parses first signal for a plurality of textual elements. Plurality of textual elements may include any data described above as included in plurality of textual elements, including without limitation a first identifier, which is transmitter identifier. Data include in plurality of textual elements includes at least a second identifier, which may include any identifier suitable for use as at least a second identifier as described above. Where first signal is in digital form, portable computing device 104 may interpret a digital sequence contained within first signal by rendering it according to an encoding method for one or more data types; for instance, and without limitation, portable computing device 104 may divide a string of binary digits into fixed-length blocks, such as bytes of data, and map those blocks to a data type encoded by those blocks, according to any suitable protocol. As a non-limiting example, portable computing device 104 may interpret a binary string as character data. First signal may be received in a particular format, such as one or two packets; persons skilled in the art, upon reading the entirety of this disclosure, will be aware of many ways in which first signal may be encoded, transmitted, received, and decoded. Plurality of textual elements may implement a protocol whereby one or more fields or elements are labeled, such as, without limitation, XML or packet-based protocols. Plurality of textual elements may implement a protocol whereby fields in a prescribed order are separated by delimiter characters, which may be otherwise unused, such as commas in comma separated value (CSV) files. Plurality of textual elements may be ordered in a strict character-count order, in which unique identifier is always found a particular number of characters from an endpoint and has a length of a particular number of characters. Portable computing device 104 may be configured to identify and copy unique identifier according to any protocol in which plurality of textual elements is encoded. Plurality of textual elements and/or first signal may include, without limitation, a UPC, stock keeping unit (SKU) or other datum linked to a product or item for sale at retail space 200. In an embodiment, where first transmitter 112 includes a writable memory section, datum linked to a product or item for sale may be stored in the writable memory section; such data may be updated upon changes to planogram 120 and/or placement of one or more items within retail space 200 as described in further detail below.

Still referring to FIG. 4, plurality of textual elements may include including a product information datum relating to the product. A "product information datum," as used in this disclosure, is an element of data describing a product, including without limitation describing a one or more categories of product the product belongs to, one or more manufacturing characteristics, one or more identifications of a specific product, a lot of products, a shipment of products, or the like. Product information datum may include, without limitation, location of product in store, directions to the product from location of wireless first transmitter and/or product at which it is located, or the like; directions may be generated as described above, including in terms of navigating past or through other portions of the retail space such as aisles, bins, or the like. Product information datum may include a description of the product, such as contents, ingredients, nutrition, certifications, safety information, or the like. Product information datum may include pricing, including comparison to prices at nearby establishments. Product information datum may include instructions for use of the product, including operation, consumption, part replacement, and/or maintenance. Product information datum may include marketing information such as coupons, advertisement, recipes, contests, or videos involving or about the product. Product information datum may include product history, such as history of repairs, maintenance, manufacturers, logistics, or the like. Product information datum may include nutritional information, such as absolute quantities per serving of one or more nutritional elements, quantities expressed as a percentage of daily recommended amounts or one or more nutritional elements, or the like. Product information datum may include one or more certifications, such as kosher, halal, and/or organic certifications for food products. Product information datum may refer not only to a product type or brand, but to each individual item; for instance, product information data may include a lot number of products, such as without limitation food items, that are produced at a specific plant on a specific date, an identifier of a shipment and/or case of such products, and/or an identifier of a specific product attached to and/or adjacent to transmitter 112.

Still referring to FIG. 4, product information datum may include a description of a related product. In an embodiment, a related product may include any product that is linked or associated with product in a data structure as described above. A related product may include any product included with product 208 in an instruction set such as a recipe. A related product may include a product that is of a similar type to product 208. A related product may include a product that includes a common ingredient with product 208. A related product may include a product having a common component with product 208. A related product may include a product having a common function and/or purpose to product 208. A related product may include one or more other products a manufacturer of product has created and/or has for sale, and/or other products of the same brand. Related products may include products that have the same dietary restrictions, and/or products that are and/or that are frequently used with the product, including in recipes or the like.

With continued reference to FIG. 4, plurality of textual elements may include a current status datum. A "current status datum," as defined herein, is a datum reflecting recent treatment of the product; the current status datum may be generated using and/or as a function of one or more elements of data describing the recent treatment. For instance, and without limitation, current status datum may be generated using a local storage history of the product, which may include one or more previous storage locations, a number of times the product has been moved, one or more locations in which product has been stored such as warehouse, display case, or the like and/or one or more conditions of storage including without limitation temperature, humidity, or the like. As a further non-limiting example, current status datum may be generated using a return history of the product, defined as a quantification of customer returns of a particular product, including a number of times the product was returned, a number of times the product has been repackaged, scores and/or other quantifiable measures indicative of reasons for returns, or the like. As an additional non-limiting example, current status datum may be generated using shelf time of the product, defined as an amount of time the particular product has been on a display shelf, an amount spent in a warehouse, and/or an amount of time spent in another storage location, or the like. In an embodiment, and without limitation, current status datum may include and/or be implemented as a score reflecting any of the above sources of data. Score may be higher, for instance, for a product that has never been returned and/or repackaged and lower for a product that has been returned and/or repackaged once; score may be lower still for a product that has been returned and/or repackaged multiple times, where lower of score may be greater for a greater number of returns and/or repackaging events. As a further non-limiting example, score may be lower for a product that has been a display model than for a product that has not been a display model. As a further non-limiting example, a score may be lower for longer shelf and/or storage time. Rules for establishment of scores may be product-specific; for instance, a perishable product and/or product that tends to degrade over time may experience a greater lowering of score with increase in shelf time than a lowering of score for a product that is not perishable and/or does not degrade over time. Similarly, temperature and/or humidity of storage conditions may have a greater effect on a score for a product having temperature and/or humidity requirements for storage than for a product without such requirements. A "lower" score, as used herein, indicates a score representing a less desirable situation and/or less valuable product, rather than a numerically lower score; scores may be represented with high numbers representing high scores, lower numbers representing lower scores, and/or any other arrangement therefor that may occur to a person skilled in the art upon reviewing the entirety of this disclosure. Current status datum be stored in or referred to from any data structures as described in this disclosure, such as without limitation an organization data structure 332 and/or site data structure 324.

Continuing to refer to FIG. 4, plurality of textual elements may include one or more additional elements of data, including without limitation one or more advertisements, coupons, discounts, videos, and/or recipes, as described in further detail below. At least an additional datum may include any data described above in reference to FIGS. 1-2, including without limitation data identifying a proprietor and/or entity operating retail space 200, data identifying and/or linked to a particular location within retail space 200 and/or on a display structure 204, and/or data identifying a sale, coupon, promotion. Portable computing device 104 may provide the at least an additional datum to the user via the user output device 132; at least an additional datum may be provided with a usage sequence as set forward in further detail below or may be provided separately. As a further non-limiting example, plurality of textual elements may include a user category datum. A "user category datum," as used in this disclosure, is an element of data describing a category of users, such as an attribute, group membership, demographic feature, and/or other attribute shared by a group of users; additional flags and/or indicators in user category datum may indicate a relationship between product 208 and the group of users, which may include a positive relationship such as appeal to or health benefits for such a group and/or a tendency not to like the product and/or a health problem associated with and/or exacerbated by the product for the group. For instance, and without limitation, the user category datums may identify groups of user identifiers having common interests, common needs for assistance or accommodation, and/or access privileges. For instance, may at least a user category datum may identify a group of users that are affiliated with an institution, company, business, or club, a group of users with a certain degree of visual or mobility impairment, or the like; each user identifier may be associated with one or many groups and/or user category datums. Any user category datum may have any structure or contents suitable for use as a user identifier, and may be produced, generated, or received according to any process or using any device or module suitable for production, generation, or reception of a user identifier. A user category datum may identify a category of users likely to have an allergy to a product such as a food product and/or wearable item. A user category datum may, as a further non-limiting example, describe a set of users likely to be interested in product based on group information or other data as described in further detail below. Persons skilled in the art, upon reviewing the entirety of this disclosure, will be aware of various alternative or additional examples of user categories that may be employed in embodiments as disclosed herein.

With continued reference to FIG. 4, one or more components and/or elements of system 100, such as without limitation portable computing device 104, user data structure 128, or another database and/or data structure incorporated in system 100, may contain one or more elements of group information associated with user class identifiers. Group information may be information concerning a group of users related by a particular interest or other commonality, for instance as identified by a user category datum. For instance, group information may describe class identifiers, lists of products, or other information concerning a group having a hobby or other interest in common, one or more owners or employees of local retail or service establishments that frequently make use of one or more products such as product 208, one or more professions and/or sets of professions including such persons, or the like. Group information and/or user category datum may identify a potential group and/or class of users that is engaged in a given activity, such as following a recipe or one of a set of recipes, and/or one or more projects and/or a set of projects, such as "do it yourself" projects in which product 208 is to be used and/or employed. Each of these forms of information may be accessible to a user and/or to portable computing device 104; in some embodiments, user instructions indicating a desired activity or sequence may cause the information to be filtered, for instance based on user data and/or user-entered information as described below. User-entered information may include any data describable using user text, voice, or other entry, including without limitation contents data, navigation sequences and/or data, usage sequences and/or data, operational data, or the like.

Still referring to FIG. 4, any data entered or contained in system 100 with respect to and/or linked to transmitter may be associated with one or more access levels or controls, including without limitation data limited to only a single user, data available only to a group of users, and/or data available to any user operating system 100 and/or any device or component included within system. Thus, for instance, a first user operating a mobile computing device as disclosed herein may be presented with a first set of information linked to at least a first transmitter, while a second user may be presented with a second set of information; first set may differ from second set, for instance and without limitation by exclusion from second set of private and/or group-related information linked to first user and not second user, and/or by inclusion of private and/or group-related information linked to second user and not first user. Further continuing the example, first set and second set may have in common data that is publicly available and/or data linked to a group in which both first user and second user are members. As an example, employees of a retail establishment or entity operating retail space 200 may have access to information that is not provided to customers, while a manager or other person with greater authority in such an entity may have access to further information unavailable to employees. Information may alternatively or additionally be provided based on and/or according to user roles within an entity and/or organization operating retail space 200; for instance, a person charged with maintaining and/or updating planograms or other spatial information concerning products in retail space 200 may have access to and/or rights to modify such information, employees restocking shelves may have read-only access to planogram information, and other employees may have no access to planogram information at all. Persons skilled in the art, upon reviewing the entirety of this disclosure, will be aware of various ways in which information may be shared and/or limited for different users based on private, group, and public access levels or categories, as disclosed herein.

Still referring to FIG. 4, plurality of textual elements may include a class identifier. As used in this disclosure, a "class identifier" is an identifier that identifiers two or more transmitters, which may be located at two or more distinct items and/or at two or more distinct locations; class identifier may be unique to a particular set of transmitters, which may be owned or operated by an entity or individual. Class identifier may include, without limitation, a group identifier or entity identifier as described above; for instance, class identifier may be linked to and/or identify a person, company, group of people, or the like. A class identifier may include a class identifier associated with a store, a geographic region, a regional set of stores, a department, a category of goods, a location and/or supply chain from which goods are received, or the like.

At step 420, and with continued reference to FIG. 4, portable computing device 104 retrieves at least a product information datum using the plurality of textual elements. In an embodiment, portable computing device 104 may identify, using at least a second identifier, which may include without limitation a site identifier 312, a site data structure 324; this may be accomplished, without limitation, by retrieving an identity, network address or other identifier of a remote device 148 having an instance of site data structure 324. Remote device 148 may include without limitation a remote device 148 that is geographically proximate. Network address or other identifier may be downloaded to portable computing device, for instance, upon detection of arrival at retail space 200 as described above; alternatively or additionally, a portable computing device 104 may be configured to store such network addresses or other identifiers locally, to retrieve a list or other structure linking such network address and/or identifiers to site identifiers 312 from a remote device 148 already identified to portable computing device 104 or the like. Portable computing device 104 may retrieve at least a product information datum using the transmitter identifier from the site data structure 324; this may include, as a non-limiting example, transmitting site identifier 312, organization identifier 308, transmitter identifier 304, element of circumstantial data as described in further detail below, and/or an element of user data such as without limitation a user identifier 336 to a remote device 148, receiving a local instance of the site data structure 324 from the remote device, and storing the local instance of the site data structure on the portable computing device. This may be performed earlier, such as upon detection of entry into retail space 200 or the like, permitting localized and network-free subsequent interaction with site data structure 324. Alternatively or additionally, portable device 104 may query site data structure 324 at a remote device 148, which may be identified as described above.

In an embodiment, and continuing to refer to FIG. 4, portable computing device 104 may identify, using at least a second identifier, which may include without limitation an organization identifier 308, an organization data structure 332; this may be accomplished, without limitation, by retrieving an identity, network address or other identifier of a remote device 148 having an instance of organization data structure 332. Remote device 148 may include without limitation a remote device 148 that is geographically proximate. Network address or other identifier may be downloaded to portable computing device, for instance, upon detection of arrival at retail space 200 as described above; alternatively or additionally, a portable computing device 104 may be configured to store such network addresses or other identifiers locally, to retrieve a list or other structure linking such network address and/or identifiers to organization identifiers 308 from a remote device 148 already identified to portable computing device 104 or the like. Portable computing device 104 may retrieve at least a product information datum using the transmitter identifier from the organization data structure 332; this may include, as a non-limiting example, transmitting organization identifier 308, organization identifier 308, transmitter identifier 304, element of circumstantial data as described in further detail below, and/or an element of user data such as without limitation a user identifier 336 to a remote device 148, receiving a local instance of the organization data structure 332 from the remote device, and storing the local instance of the site data structure on the portable computing device. This may be performed earlier, such as upon detection of entry into retail space 200 or the like, permitting localized and network-free subsequent interaction with organization data structure 332. Alternatively or additionally, portable device

104 may query organization data structure 332 at a remote device 148, which may be identified as described above.

Still referring to FIG. 4, computing device 104 may identify any data structure as described above as a function of class identifier. In an embodiment, class identifier may include an identifier of remote data structure, which may be any identifier usable to identify or locate any database or data structure as described above; for instance, identifier of remote data structure may include a URL, other network address, or other device identifier of a remote device, or may be linked to such URL, other network address, or other device identifier in any additional data structure or the like as described above in reference to FIGS. 1-3. Portable computing device 104 may retrieve one or more elements of data from a remote data structure; as a non-limiting example, a company, store, group, or other entity operating the transmitters may operate remote data structure, and add to or update data on the remote data structure such that portable computing device 104 can receive such data upon receiving a signal from any transmitter linked to class identifier.

At step 425, and continuing to refer to FIG. 4, portable computing device 104 generates a display element using the product information datum. Display element may include one or more elements of plurality of textual elements, for instance by display on a display 136 and/or user output device 132 as described above. Alternatively or additionally, one or more elements of plurality of textual elements may be used as inputs to a process generating display element as described in further detail below, for instance and without limitation by matching textual elements to one or more elements of data stored on portable computing device 104. For instance, a class identifier provided in plurality of textual elements may be matched to a class identifier associated with a set of transmitters a user of portable computing device 104 is authorized to access and/or write to, and/or with regard to which the user is authorized to modify and/or update spatial information as described in further detail below.

As a further example, and still referring to FIG. 4, generating display element may include providing, by the portable computing device, an element of user data, and generating using the element of user data and the product information datum; providing may include storing, on the portable computing device 104, user identifying and/or logon information, as well as one or more elements of user information which may have been entered by user, associated with a user account of user operating portable computing device 104 or the like. Generating may include, for instance and without limitation, outputting a message indicating that element of user data matches a user category datum; a message based on such a match may alternatively or additionally be generated based on an identification of user as having an adverse reaction to product 208 based on user identification and user category datum and/or identification of user affinity to and/or likely need for product 208, where a message may include, for instance, a stored textual output or other message. Generating display element may alternatively or additionally include retrieving, by the portable computing device, an element of user data, and generating using the element of user data, the product information datum, and the current status datum.

Still referring to FIG. 4, element of user data may include group membership information as described above; for instance, and without limitation, if user is an employee of an entity operating retail establishment 200 as described above, display element may display and/or offer fields for alternation of a planogram or other spatial data, for instance as consistent with authorization as described above. Alternatively or additionally, portable computing device 104 may generate display elements using and/or as a function of user history; for instance, and without limitation, user history may be used to identify recipes or other processes in which user is engaged, and/or products user has previously purchased, for generation of discount offers and/or recipe-related instructions as described in further detail below. As a further non-limiting example, where plurality of textual elements includes a user category datum, portable computing device 104 may generate display element as a function of user category datum and user history; for instance and without limitation, portable computing device 104 may identify one or more user category datums matching user based on user history. An element of user data may include, without limitation, a user activity history datum, defined as any data describing recent user activities such as recipes and/or projects as described in further detail herein. User history data may include a user purchase history datum, which may include without limitation any purchases a user has made recently, any purchases a user has made at retail space 200, a comprehensive history of user purchases, and/or user purchases made in a recent period of time, such as purchases in the past day, week, month, year, or the like. User history data and/or element of user data may include a user purchase session datum, defined for purposes of this disclosure as an element of datum describing user activity during a current trip to retail space 200.

With continued reference to FIG. 4, generating the display element may include retrieving an element of circumstantial data and generating the display element as a function of the element of circumstantial data solely and/or in combination with product information datum. As used in this disclosure, "circumstantial data" is any data, excluding user location or a user entered request, describing circumstances affecting, and/or a current condition of the user, of items, including objects and/or living organisms, within spatial bounding constraint, and/or a space overlapping spatial bounding constraint. Circumstantial data may include without limitation a personal schedule, space and/or room schedule status, or other current schedule detail. As a further non-limiting example, circumstantial data may include data describing history of user interactions with system; such history of user interactions may be used to predict a likely current and/or future user interaction. Circumstantial data may include a user orientation. Circumstantial data may include a recent direction of user travel; recent direction of user travel may be determined in any way described in this disclosure, including without limitation by determining an order of interaction with transmitters as described herein, a navigational sequence and/or set of instructions user of portable computing device 104 is following and/or has recently followed. Circumstantial data may include and/or be combined with a set of recent user activities, which may include any user history data as described above.

Continuing to refer to FIG. 4, generating display element may include comparing product information datum to one or more user requirements, and outputting a signal based on the comparison. At least a user requirement may include, without limitation, any instruction entered by user describing at least a user requirement, which may include any specification of a product, product type, ingredient, nutritional item and/or component, purpose and/or use, or other attribute that user desires in product or wishes to avoid. Items user wishes to avoid may include, without limitation, items user to which use has an allergy, items user is prohibited from consuming and/or using pursuant to a religious or ethical belief, and/or any other items user specifies that use wishes to avoid. One or more user requirements may alternatively or additionally be retrieved from user data structure 128 and/or any other data structure as described above. One or more user requirements may be retrieved from memory of portable computing device 104. Signal may indicate that a requirement is met by product and/or that product does not meet a requirement. For instance, and without limitation, signal may indicate that product matches a product user requested; as a non-limiting example, user may use portable computing device 104 as a "wand" user repeatedly taps on or passes over various transmitters until encountering a transmitter at a product matching a product user is looking for, upon which signal may be generated. As a further non-limiting example, signal may be generated as a warning to user that product may be harmful to user based on a user allergy or condition, that product may violate a user ethical or religious prohibition or restriction, or the like.

Still referring to FIG. 4, signal may include a verbal signal in textual and/or audio form. Signal may alternatively or additionally be output using a light-based or haptic signal according to a recognizable code or codes. As a non-limiting example, a light and/or display may light up with a first color for a positive match and a second color for a warning, while a product that is neither a match nor a warning may give rise to a third color, or not light up at all; as a further non-limiting example, a haptic signal may use two short pulses to indicate a positive match, a single long pulse to indicate a warning, or the like. Display element may combine two or more of the above-described features and/or steps.

With continue reference to FIG. 4, display element may include a video, such as a video of instructions for using, repairing, and/or maintaining product 208, for combining product 208 with other products, or the like. Display element may include a coupon or discount redemption code that a user may use to obtain a discount or promotional price by displaying to an employee or proprietor, scanning at or transmitting to a POS system or device such as a payment kiosk and/or vending machine, and/or using in performing a mobile payment as described in further detail below.

In an embodiment, and continuing to refer to FIG. 4, as part of generating display element, portable computing device 104 may generate a recipe using one or more instructions for cooking and/or preparation of food; in an embodiment, instructions may be stored in product database. For instance, a table of recipe and/or dish names in product database may link such recipe and/or dish names to names of ingredients, which may in turn be linked to data, such as SKU data or the like, identifying one or more products. Portable computing device 104 may generate navigation instructions to arrive at a first product of one or more products, and upon scanning and/or receiving a signal from a transmitter at the first product may generate navigation instructions to a second product; selection of a second product may be performed by comparing distances to other products from first product, and selecting a minimal distance of the compared distances. Location of each product may be determined using any spatial information data structure 116 and/or planogram 120 as described above in reference to FIGS. 1-2. Recipe may be selected initially by entry by a user into portable computing device 104 and/or another computing device of a desired recipe or of one or more ingredients; alternatively or additionally, recipe may be retrieved as product information datum upon scanning, displayed to user, and selected by user. Portable computing device 104 may alternatively or additionally generate directions to replacement parts, related products, or the like.

Still referring to FIG. 4, any product information datum, recipe, and/or other instructions as described above may be recorded locally on portable computing device 104 and/or written to user tag 140. For instance, user may instruct portable computing device 104 to write product information datum to user tag and/or to link product information datum to an identifier of user tag, and then attach user tag to product subsequent to purchase; as a result, user may be able to obtain any and all product data concerning product a second time by scanning user tag 140, followed by any or all processes described in this disclosure for use of product data. For instance, user may scan user tag 140, causing retrieval and/or display of recipes using product, instructions for use of product, and/or product information for replacement parts such as, e.g., new coffee filters for a coffee machine or the like. Persons skilled in the art, upon reviewing the entirety of this disclosure, will be aware of various ways in which writing product information datum to user tag 140 may be incorporated in methods as described in this disclosure.

Further referring to FIG. 4, generation of display element may include generation based on current status datum. For instance, and without limitation, current status datum may be displayed to user as part of or in conjunction with any other portions of display element. Alternatively or additionally, one or more discounts, modifications to warranties, or the like may be modified and displayed to user via display element. Such discounts, warranty modifications, discounted prices, or the like may be employed and/or accepted during purchase, for instance and without limitation purchase as described below. As a non-limiting example, a current status datum that is a score falling below a given threshold, which may be a stored number on portable computing device 104 and/or in system 100, may give rise to a pre-configured discount such as without limitation a 10% discount or the like. As a further non-limiting example, a current status datum indicating a number of returns of a particular product exceeding a given stored threshold, a current status datum indicating an amount of time on the shelf, in storage, or the like of a particular product exceeding a given stored threshold, and/or any amount and/or number of instances of sub-optimal and/or counter-indicated storage practices falling below a given stored threshold, may trigger a discount. A threshold may be a numerical quantity stored in memory.

At step 430, and still referring to FIG. 4, portable computing device 104 displays the display element to the user. Presenting the display element to the user may be accomplished using any means or methods suitable for presentation of data to a user as described above in reference to FIGS. 1-2, including without limitation transmitting information to a user output device 132. For instance, and without limitation, presenting display element to the user may include presenting the display element using an audio, visual or tactile output device. Displaying may include generating navigation instructions to another location; location may include location of an additional and/or second transmitter 212, location of another product, location of another display structure 204 and/or another location within retail space 200. Generation of navigation instructions may be performed, without limitation, as described above.

Continuing to refer to FIG. 4, portable computing device 104 and/or another computing device in system 100 may receive a product status update, generate a modified product information datum using the product status update, and write the modified product information datum to a site data structure. Modified product information datum may include a change to a current status datum, a change to a current location of product and/or location of product in a planogram, or the like, for instance as described in further detail below. In an embodiment, portable computing device and/or another computing device 104 and/or another computing device in system 100 may identify a user data structure 128 having indexing data matching plurality of textual elements, where "indexing data" as used in this disclosure refers to data including one or more of transmitter identifier 304, site identifier 312, and organization identifier 308. Portable computing device 104 and/or another device of system 100 may update indexing data of the user data structure; in an embodiment, indexing data of user data structures 128 may be editable by one or more computing devices in system 100 and/or a user may be provided opt-in messages requiring user acceptance of indexing changes. As an illustrative example, a user record that pertains to a product that was sold at a first transmitter may be updated, based on a move of that product to a second transmitter. As a result, a portable computing device or other device operated by user may generate directions to relocated product, user inputs relating to product may be linked automatically to transmitter identifier 304 of second transmitter, such that any reviews, personal notes, and/or other information user enters that pertain to the product, a past interaction involving the product, or the like, may be linked to new transmitter identifier 304.

Still referring to FIG. 4, indexing data on any of user data structure 128, site data structure 324, organization data structure 332, any other data structure in system 100, and/or any copies, and/or instances thereof may be updated to reflect a move of transmitter location to a different part of retail space 200 and/or to a different retail space, or the any other change that occasions a change in data associated with transmitter identifier 304, site identifier 312, and/or organization identifier 308.

Further referring to FIG. 4, portable computing device 104 may receive a product status update, generating a modified current status datum using the product status update, and write the modified current status datum to the first transmitter. For instance, and without limitation, portable computing device 104 may receive any element of data described above as usable in generation of current status datum, such as one or more instances of returns of product, one or more instances of repackaging of product, one or more instances of incorrect and/or sub-optimal storage based on temperature and/or humidity, or the like; these may be compared to thresholds and/or otherwise used to recalculate and/or replace current status datum. As a further non-limiting example, portable computing device 104 may receive a notification of continued shelf and/or other storage of product, and/or determine from received information omitting an indication of movement off of shelf or out of storage, for instance by purchase, of product, calculate elapsed time, modify length of storage time, and modify and/or recalculate current status as a result.

Still referring to FIG. 4, in an embodiment, one or more elements of system 100 may receive a user request; user request may be received at and/or via portable computing device 104, for instance by manual entry by a user at the portable computing device 104, reception from a user tag, or the like. Alternatively or additionally, system 100 may receive user request over a network such as without limitation the Internet from or by way of a remote device. User request may include any request regarding a retail space 200 and/or a product sold therein, including without limitation a request to carry a new product, a request to restock a product currently or previously available a retail space 200, a request for a special order of a product not normally available, a placement of a large order for a special event, and/or a request physical assistance such as a request for aid in getting a product off a high shelf or the like. User request may further include, without limitation, a request ordering a group of products to be delivered to a specific address, including without limitation at a specific time, within a window of time, and/or during a recurring timeframe; user request may include placing a plurality of such orders, each to be delivered to one or more addresses at a specific time or window of time for each order.

In an embodiment, and still referring to FIG. 4, system 100 and/or one or more steps of method 400 may be used to perform one or more product inventory management processes by operators, employees and/or proprietors of retail space 200. For instance, and without limitation, where a product 208 has run out at its location on a shelf, a customer may enter an instruction reporting that the product has run out; alternatively or additionally, an employee may enter that information. Where portable computing device 104 is being operated by employee, portable computing device 104 may generate navigation instructions, as described above, to a storage room and/or warehouse location containing one or more units of the product 208, and/or from such a location to a location on display structure 204 where product is to be placed. As a further example, information related to the servicing of equipment/fixtures may be tracked, updated, and/or provided via system 100; for instance tags may be placed on kiosks, refrigerators, shelving, or other non-saleable items. Service records and/or schedules of required maintenance may be maintained and/or tracked in product data structure 124 or other data structures described herein. A user such as retail space personnel who scans a tag on or at equipment and/or fixtures may receive information describing currently needed and/or previously performed maintenance, including cleaning, part replacement, tune-ups, and/or checks for current or incipient mechanical problems. Similarly, upon performance of a maintenance action such as repairing, replacing, and/or cleaning one or more items of equipment and/or elements thereof, a user may enter information indicating that the maintenance action has taken place; information may be linked to a transmitter of at least a first transmitter 112 and/or to an item of equipment to which the at least a first transmitter 112 is attached. Information may be selected by user, as a non-limiting example, in a user interface in which maintenance information is displayed; for instance, a required maintenance action may be displayed along with a button, textual entry field, or other event-handling item whereby a user may enter data indicating that a maintenance action has been performed. Such user-entered data may be updated in any and all data structures.

With continued reference to FIG. 4, in an embodiment, employees, proprietors, and/or operators of retail space 200 may use system 100 as part of entering, updating, modifying and/or implementing a planogram 120. For instance, a user of portable computing device 104 may create a planogram by traversing retail space 200, scanning transmitters 112, 212, and entering instructions identifying products currently located at transmitters 112, 212. A user may move a product to a new location, scan a transmitter at that location, and enter information indicating that the product is now located at the scanned transmitter; system 100 may update planogram to reflect the change. Alternatively or additionally, one or more persons may modify the planogram; portable computing device 104 may provide a series of navigational instructions indicating to a user where to move products to match the planogram, correct performance of which user may verify by scanning transmitters at instructed locations. Persons skilled in the art, upon reviewing the entirety of this disclosure, will be aware of various additional ways in which system 100 may interact with planogram consistently with this disclosure.

In an embodiment, and still referring to FIG. 4, where placement of a product in retail space 200 and/or planogram 120 is adjusted and/or changed as described above, product-identifying information on at least a first transmitter 112 may be changed to reflect the change. For instance, where a product identifying datum such as a UPC and/or SKU code is recorded in writable memory of at least a first transmitter 112, portable computing device 104 and/or another device in wireless communication with the at least a first transmitter 112 may transmit a command to overwrite the writable memory with a new or updated UPC and/or SKU code to reflect a change in placement. Subsequent updates to data structures such as without limitation product data structure 124 and/or planogram 120 may be updated by reference to such an update product identifying datum, for instance by linking an entry for an identifier of a transmitter to a database entry containing product information linked to the product identifying datum. In an embodiment, this process may aid in streamlining product replacement procedures by making it possible to update product identifying information automatically and/or by electronic technology.

With continued reference to FIG. 4, portable computing device 104 may alternatively or additionally retrieve product information datum and/or display element from any data structure as described above, including without limitation product data structure 124; for instance, and without limitation, portable computing device 104 may extract an identifier of the first transmitter from the plurality of textual elements. Portable computing device 104 may retrieve product information datum from a POS system as described above. Portable computing device 104 may retrieve product information datum from local memory. Portable computing device 104 may retrieve product information datum from a remote device. Portable computing device 104 may alternatively or additionally retrieve product information datum from, or using data retrieved from, user data structure 128. For instance, and without limitation, portable computing device 104 may determine user access levels based on information in user data structure 128 and/or user stored on portable computing device 104. Data may be retrieved, in a non-limiting example, using a user identifier and/or data linked to products, such as UPC and/or SKU data.

Still referring to FIG. 4, product information datum and/or display element may include publicly available data that may be accessed regardless of user identity and/or access level. Alternatively or additionally, data may include one or more elements of data that are available to and/or specifically returned by default based on user data, such as user logon credentials, user membership in a group, or the like. For instance, and without limitation, a user may be identified by a remote device, user data structure 128, portable computing device 104, and/or at least a first transmitter 112 as a user that entered or has access rights, is set to view by default, or has requested to view to a particular datum, which may be provided based on detection by remote device, portable computing device 104, and/or at least a first transmitter 112 of user identifier and/or credentials; user identifier and/or credentials may be transmitted to any of remote device 120, portable computing device 104, and/or at least a first transmitter 112, and any such device may forward user identifier, user credentials, or any other datum indicating access rights to a user or group-specific datum. Remote device 120, portable computing device 104, and/or at least first transmitter 112 may alternatively or additionally determine based on user credentials or identification that the user has no access rights, has not requested to view, and/or has requested not to view a particular datum. User credentials and/or identifier may link user to a group, such as a group of users having a common. Data pertaining to an individual user may also pertain to interests, duties, or needs for accommodations of the individual user.

Continuing to refer to FIG. 4, product information datum may include at least a user-entered value. At least a user-entered value may include any item of product data as described in this disclosure. User-entered value may be stored in any data structure as described above in records accessible only to user, in records accessible to one or more groups in which user is a member, and/or in records accessible to the public; user may be given a choice to specify which of user-specific, group, or public access should be applicable to user-entered value, including without limitation specification of which group of a plurality of groups in which user is a member should receive the data. Alternatively or additionally, system 100 may restrict user ability to enter public and/or group data; for instance public data may be modifiable only to users belonging to a group working for an owner of at least a first transmitter 112, user-added information may be permitted only in certain portions of public data, such as a repository or forum for user feedback or the like, and/or group data may be modifiable or added to only for group members. Persons skilled in the art, upon reviewing the entirety of this disclosure, will be aware of various categories and/or forms of access users may be provided for entering and/or receiving product data.

Still referring to FIG. 4, user entered data may be stored on any of user data structure 128, site data structure 224, and/or organization data structure 332, for instance as described above. User data and/or user updates may be stored locally, for instance on portable computing device 104, stored on a remote device 148, and/or stored locally and subsequently transmitted to remote device 148. Upload and/or transmission to remote device 148 may be triggered upon detection of localized connection to remote device, for instance via LAN, and/or remote connection thereto via an Internet or other wide-area network connection.

Continuing to refer to FIG. 4, portable computing device 104 may initiate payment for product and/or a related product; user may, for instance, enter an instruction on portable computing device 104 to pay for product and/or related product. Payment may be performed via a POS system in retail space 200, via a mobile payment at a kiosk or other device, and/or over a network, such as the Internet through, for instance, a website affiliated with an entity operating retail space 200. Any of the above-describe steps may alternatively or additionally be initialized by manual entry of data and/or entry of data via electronic communication with another device.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
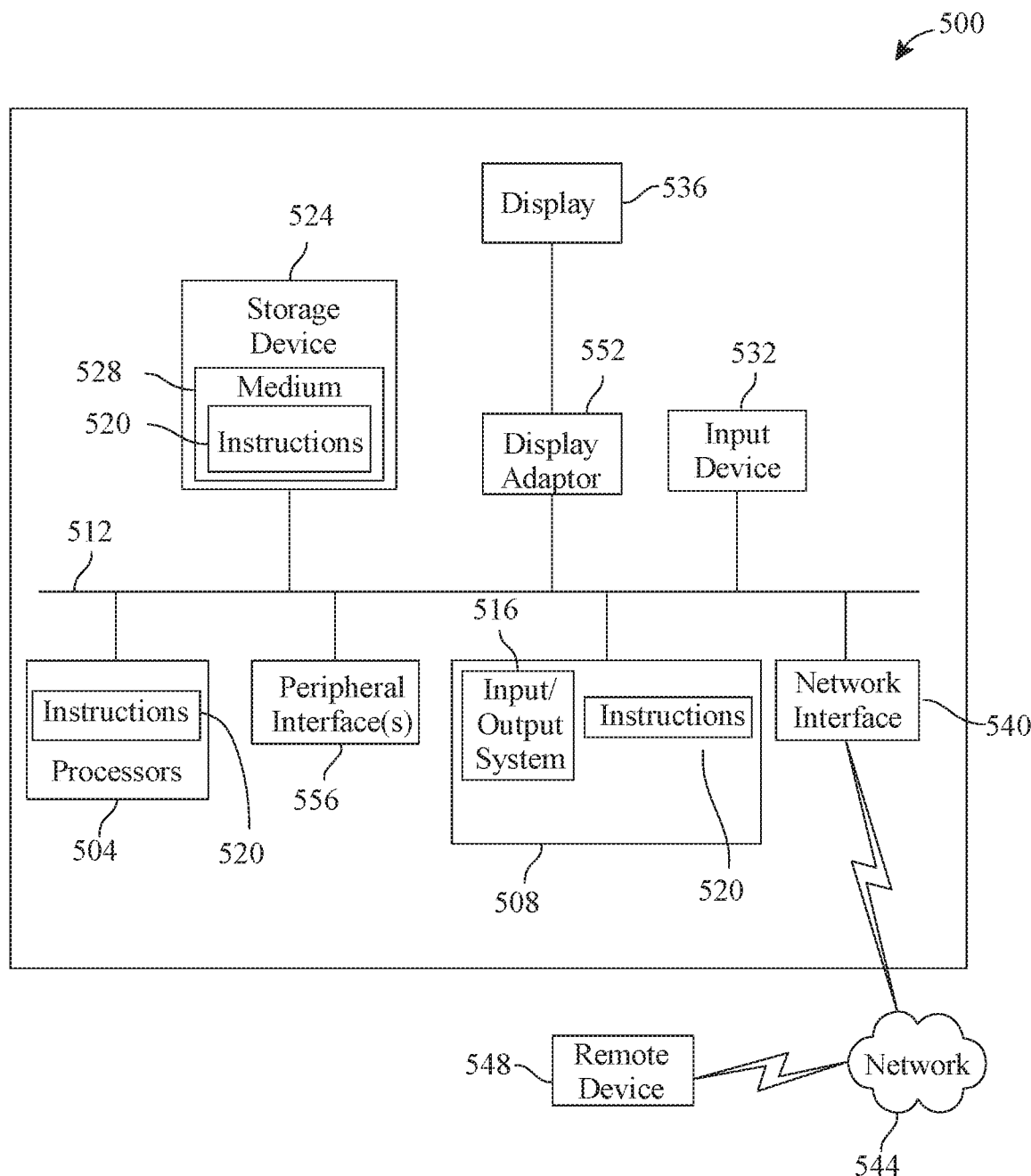
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of providing wireless guidance in a retail space, the method comprising:
   wirelessly transmitting, by a portable computing device operated by a user and using at least an antenna, an interrogation signal to a first transmitter located at a product in a retail space, wherein:
   the first transmitter is a passive transponder; and
   the interrogation signal induces an electrical current in the first transmitter, the electrical current powering the first transmitter to generate a return signal;
   wirelessly receiving, by the portable computing device, the return signal;
   parsing, by the portable computing device, the return signal for a plurality of textual elements, the plurality of textual elements including a first identifier, wherein the first identifier is a transmitter identifier, and at least a second identifier;
   retrieving, by the portable computing device, at least a product information datum using the plurality of textual elements, wherein the product information datum further comprises instructions for using a product, and wherein the at least a product information datum further comprises a recipe for preparation of food using the product and a plurality of related products as ingredients;
   generating, by the portable computing device, a display element using the product information datum;
   displaying, by the portable computing device, the display element to the user, wherein displaying the display element further comprises displaying the recipe;
   receiving a user selection of the recipe;
   automatically selecting a second product of the plurality of related products, wherein the automatically selecting further comprises:
   determining a plurality of distances within the retail space to each related product of the plurality of related products; and
   identifying the distance to the second product as the minimal distance of the plurality of distances; and
   selecting the second product based on the identification;
   generating directions to a location of the second product from a location of the first product; and
   communicating with a point of sale (POS) system to electronically perform a sale transaction, wherein the at least a product information datum and a planogram are updated based on the sale transaction.

2. The method of claim 1, wherein retrieving the at least a product information datum further comprises:
   identifying, using the at least a second identifier, a site data structure;
   retrieving, from the site data structure, the at least a product information datum using the transmitter identifier.

3. The method of claim 2 further comprising:
   transmitting the at least a second identifier and an element of user data to a remote device;
   receiving a local instance of the site data structure from the remote device;
   and storing the local instance of the site data structure on the portable computing device.

4. The method of claim 1, wherein retrieving the at least a product information datum further comprises:

identifying, using the at least a second identifier, an organization data structure; and
retrieving, from the organization data structure, the at least a product information datum using the transmitter identifier.

5. The method of claim 4 further comprising:
transmitting the at least a second identifier and an element of user data to a remote device;
receiving a local instance of the organization data structure from the remote device; and storing the local instance of the organization data structure on the portable computing device.

6. The method of claim 1, wherein generating the display element further comprises:
retrieving, by the portable computing device, an element of user data; and
generating the display element using the element of user data and the plurality of textual elements.

7. The method of claim 1, wherein generating the display element further comprises:
retrieving an element of circumstantial data; and
generating the display element as a function of the element of circumstantial data.

8. The method of claim 1 further comprising:
receiving a product status update;
generating a modified product information datum using the product status update; and
writing the modified product information datum to a site data structure.

9. The method of claim 8 further comprising:
identifying a user data structure having indexing data matching the plurality of textual elements; and
updating indexing data of the user data structure.

10. The method of claim 1 further comprising:
scanning, by the portable computing device, a user tag on the person of the user;
writing the product data to the user tag; and
associating the user tag with the recipe.

11. A system for providing wireless guidance in a retail space, the system comprising a portable computing device configured to:
wirelessly transmit, using at least an antenna, an interrogation signal to a first transmitter located at a product in a retail space, wherein:
the first transmitter is a passive transponder; and
the interrogation signal induces an electrical current in the first transmitter, the electrical current powering the first transmitter to generate a return signal;
wirelessly receive the return signal from the first transmitter located at the product in the retail space;
parse the return signal for a plurality of textual elements, the plurality of textual elements including a first identifier, wherein the first identifier is a transmitter identifier and at least a second identifier;
retrieve at least a product information datum using the plurality of textual elements, wherein the product information datum further comprises instructions for using a product, and wherein the at least a product information datum further comprises a recipe for preparation of food using the product and a plurality of related products as ingredients;
generate a display element using the product information datum;
display the display element to the user, wherein displaying the display element further comprises displaying the recipe;
receiving a user selection of the recipe;
automatically select a second product of the plurality of related products, wherein the automatically selecting further comprises:
determining a plurality of distances within the retail space to each related product of the plurality of related products; and
identifying the distance to the second product as the minimal distance of the plurality of distances; and
selecting the second product based on the identification;
generate directions to a location of the second from a location of the first product; and
communicate with a point of sale (POS) system to electronically perform a sale transaction, wherein the at least a product information datum and a planogram are updated based on the sale transaction.

12. The system of claim 11, wherein the portable computing device is further configured to receive the at least a product information datum by:
identifying, using the at least a second identifier, a site data structure;
retrieving, from the site data structure, the at least a product information datum using the transmitter identifier.

13. The system of claim 12, wherein the portable computing device is further configured to:
transmit the at least a second identifier and an element of user data to a remote device;
receive a local instance of the site data structure from the remote device; and
store the local instance of the site data structure on the portable computing device.

14. The system of claim 11, wherein the portable computing device is further configured to retrieve the at least a product information datum by:
identifying, using the at least a second identifier, an organization data structure; and
retrieving, from the organization data structure, the at least a product information datum using the transmitter identifier.

15. The system of claim 14 further comprising:
transmitting the at least a second identifier and an element of user data to a remote device;
receiving a local instance of the organization data structure from the remote device; and
storing the local instance of the organization data structure on the portable computing device.

16. The system of claim 11, wherein the portable computing device is further configured to generate the display element by retrieving, by the portable computing device, an element of user data, and generating the display element using the element of user data and the plurality of textual elements.

17. The system of claim 11, wherein the portable computing device is further configured to generate the display element by:
retrieving an element of circumstantial data; and
generating the display element as a function of the element of circumstantial data.

18. The system of claim 11, wherein the portable computing device is further configured to:
receive a product status update;
generate a modified product information datum using the product status update; and
write the modified product information datum to a site data structure.

19. The system of claim 18, wherein the portable computing device is further configured to:
    identify a user data structure having indexing data matching the plurality of textual elements; and
    update indexing data of the user data structure.

* * * * *